United States Patent
Iwasaki et al.

(10) Patent No.: US 7,702,019 B2
(45) Date of Patent: *Apr. 20, 2010

(54) MOVING OBJECT DETECTION DEVICE AND MOVING OBJECT DETECTION METHOD

(75) Inventors: Masahiro Iwasaki, Ikoma (JP); Toshiki Kindo, Yokohama (JP); Taro Imagawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 1085 days.

This patent is subject to a terminal disclaimer.

(21) Appl. No.: 11/364,284

(22) Filed: Mar. 1, 2006

(65) Prior Publication Data

US 2006/0262857 A1  Nov. 23, 2006

Related U.S. Application Data

(63) Continuation of application No. PCT/JP2004/015750, filed on Oct. 18, 2004.

(30) Foreign Application Priority Data

Nov. 20, 2003 (JP) .............................. 2003-390557
Aug. 10, 2004 (JP) .............................. 2004-232989

(51) Int. Cl.
*H04N 7/12* (2006.01)
*G06K 9/62* (2006.01)

(52) U.S. Cl. .................. 375/240.16; 382/224

(58) Field of Classification Search ................ 382/104, 382/224; 375/240.24

See application file for complete search history.

(56) References Cited

U.S. PATENT DOCUMENTS 5,687,249 A * 11/1997 Kato ........................ 382/104
6,025,879 A * 2/2000 Yoneyama et al. ..... 375/240.24
2006/0045354 A1* 3/2006 Hanna et al. ................ 382/224

FOREIGN PATENT DOCUMENTS

JP   7-50825   2/1995

(Continued)

OTHER PUBLICATIONS

Sourabh A. Niyogi, et al., "*Analyzing and Recognizing Walking Figures in XYT*", M.I.T. Media Lab Vision and Modeling Group Technical Report No. 223, 1994.

(Continued)

*Primary Examiner*—Gims S Philippe
(74) *Attorney, Agent, or Firm*—Wenderoth, Lind & Ponack, L.L.P.

(57) ABSTRACT

A moving object detection device including a spatiotemporal data generation unit 120 generating time series data, which arranges data indicating a moving object along a temporal axis, based on an output from a camera 100, an inter-leg information unit 140 extracting based on the generated time series data, inter-leg information, which is information regarding a temporal change in an inter-leg area arising from movement of a moving object that has two or more legs, and a periodicity analysis unit 150 analyzing a periodicity within the extracted inter-leg information. Further, the moving object detection devices includes a moving object detection unit 160 generating, from the analyzed periodicity, movement information that includes the presence or lack thereof of a moving object.

20 Claims, 23 Drawing Sheets

FOREIGN PATENT DOCUMENTS

| | | |
|---|---|---|
| JP | 7-141484 | 6/1995 |
| JP | 8-214289 | 8/1996 |
| JP | 9-305773 | 11/1997 |
| JP | 2000-115750 | 4/2000 |
| JP | 2001-109891 | 4/2001 |
| JP | 2001-202379 | 7/2001 |

OTHER PUBLICATIONS

Fang Liu and Rosallind W. Picard, "*Finding Periodicity in Space and Time*", M.I.T. Media Laboratory Perceptual Computing Section Technical Report No. 435, Proceedings of the International Conference on Computer Vision, Bombay, India, Jan. 4-7, 1998.

\* cited by examiner

Spatiotemporal Fragment 51

One-dimensional Data f(x) 52

Autocorrelation Function 53

Motion Vector 190

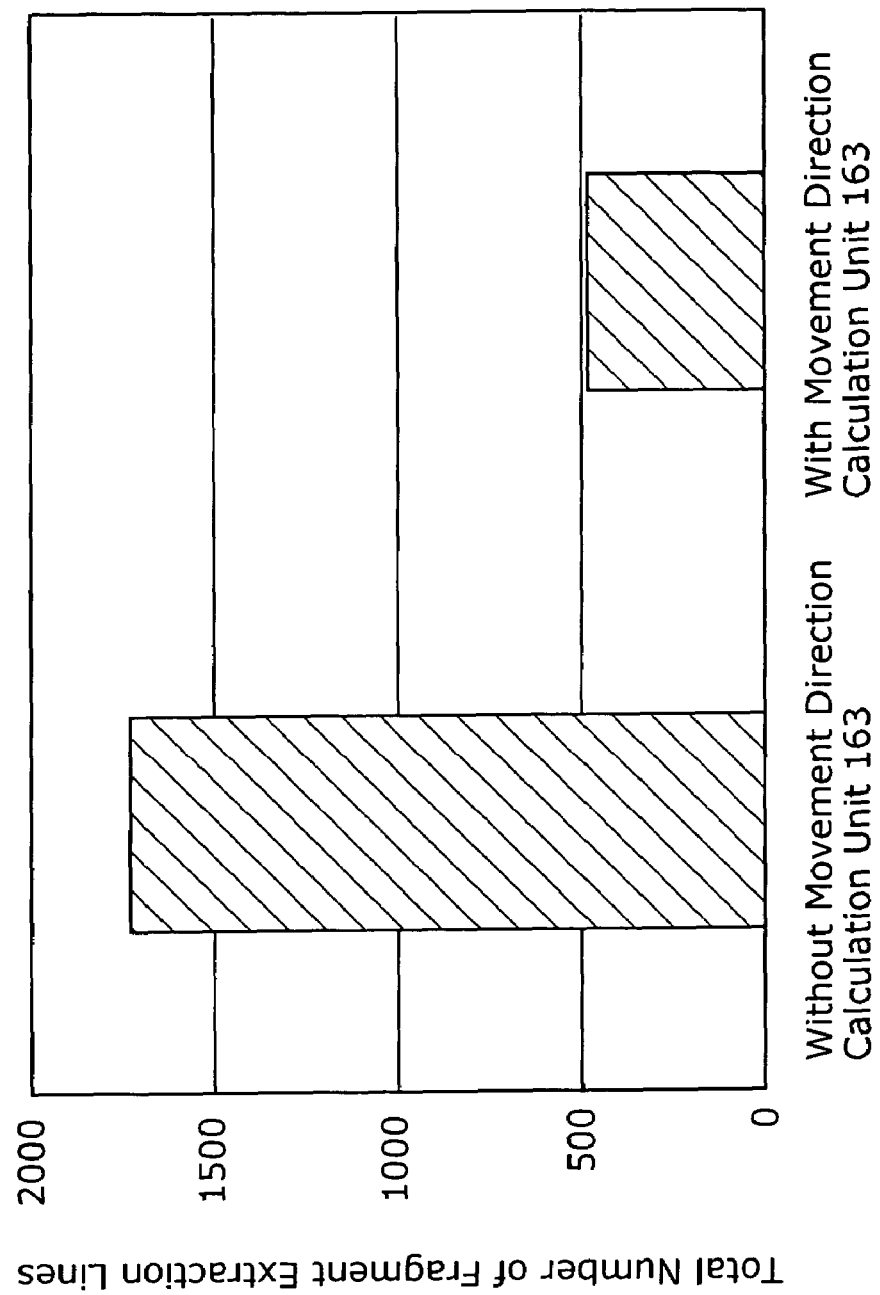

MOVING OBJECT DETECTION DEVICE AND MOVING OBJECT DETECTION METHOD

CROSS-REFERENCE TO RELATED APPLICATION

This is a continuation of PCT application No. PCT/JP2004/015750 filed Oct. 18, 2004.

BACKGROUND OF THE INVENTION (1) Field of the Invention

The present invention relates to a moving object detection device that detects, through sensor information processing or image processing, a moving object which moves with two or more legs, and particularly relates to a moving object detection device that detects the presence or absence of a moving object, a presence position, and a movement direction.

(2) Description of the Related Art

It is possible to detect a moving object, such as a person, through the use of image processing, sensor information such as a line sensor and a pressure sensor, and so on. As an example, a moving object such as a person is detected through image processing.

Much of the prior moving object detection technology uses a still image or a single differential image. When carrying out moving object detection using a still image or a single differential image, there are cases of mistaken and incomplete detection, because it is difficult to eliminate the influence of shadows due to changes in illumination conditions as well as predict, at the time of design, shape property changes in the moving object arising from occlusion and so on. On the other hand, with a method that uses an image sequence, it is possible to expect a robust detection during occlusion and temporary environmental fluctuations, because it is possible to use interpolation and a prediction mechanism during temporary fluctuations in a characteristic volume arising from occlusion and so on.

In terms of moving object detection technology using a moving picture sequence, the following technologies exist. Through carrying out a histogram calculation on an image in which a moving object has been filmed, two-dimensional image is compressed into one-dimensional data, which is arranged into time-series data, and two-dimensional image data composed of a spatial axis and a temporal axis is obtained; by finding an existence time of the object from that two-dimensional image, a time present is detected (for example, refer to Japanese Laid-Open Patent Application No. 2000-115750). With this technology, because detection of the moving object and calculation of the time present is possible without requiring the moving object to correspond between frames, it is difficult to be influenced by a temporary mistaken detection.

In addition, the following technology exists, as technology which uses prior knowledge regarding an operation which is the motion and time series information of a target object. On an image on which silhouette extraction has been carried out through differential processing, a geometric figure such as an oval is applied, and parameterization is carried out. In addition, there is a time series model on which parameterization is carried out on in advance, and by verifying, between parameters, that time series model with parameterized time series data on an actual input, movement analysis of a moving object is carried out (for example, refer to Japanese Laid-Open Patent No. 8-214289). Through this technology, it is possible to analyze even periodic movement behavior.

However, with a method that finds one-dimensional sensor data and a two-dimensional image composed of a temporal axis and a spatial axis, or that finds the existence time of the object from the sensor data, as in the technology disclosed in the abovementioned Patent Reference 1, because characteristics unique to the moving object are not used, there is the possibility that the moving object to be recognized is mistakenly judged, even in the case where another moving object is filmed and detected. Because of this, there is a necessary prerequisite in which a moving object, aside from the moving object to be recognized, may not exist in the surveillance area. In addition, particularly when being used outside, there are cases in which the histogram value becomes high due to changes in lighting conditions. Therefore, it is possible that a moving object is mistakenly judged as existing, despite the fact that a moving object does not actually exist.

In addition, with a method the executes parameterization on a silhouette image by applying a geometric figure such as an oval per-frame, as in the technology disclosed in the abovementioned Patent Reference 2, the silhouette image is obtained in a form differing from the actual form of the moving object due to the occurrence of occlusion and changes in lighting conditions. As a result, the precision of parameterization becomes unstable, and there is the danger that application of the geometric figure becomes difficult. In other words, in the case where the precision of the initial detection directly influences the precision of parameterization and the parameterization precision is poor, verification between parameters cannot be carried out accurately. Therefore, there is a problem in which high-precision analysis becomes difficult.

BRIEF SUMMARY OF THE INVENTION

Accordingly, an object of the present invention is to solve the abovementioned problems by providing a moving object detection device and method which can detect a moving object with high precision, without mistakenly detecting a moving object not to be detected for a moving object to be detected, as well as without being influenced by initial detection precision.

To achieve the abovementioned object, the moving object detection device according to the present invention detects a moving object based on an output from a target object detection sensor installed one- or two-dimensionally and includes: a spatiotemporal data generation unit that generates, based on the output from the target object detection sensor, time series data which indicates a spatiotemporal image in which two-dimensional images that show a moving object are arranged along a time axis; an inter-leg information extraction unit that extracts, based on the generated time series data, inter-leg information which is information regarding an inter-leg temporal change arising from movement of a moving object that has two or more legs; a periodicity analysis unit that analyzes a periodicity found in the extracted inter-leg information; and a movement information generation unit that generates, from the analyzed periodicity, movement information that includes whether or not the moving object is present. Through this, information of the moving object is generated based on inter-leg information which is information regarding an inter-leg temporal change arising from movement of a moving object that has two or more legs. Therefore, in the case where a detection target is an animal with legs, such as a human, mistakenly detecting an object without legs is avoided, and compared to a method in which a moving object is detected only through the application of a geometric figure, environmental conditions of the reference conditions and the influence of an initial detection are marginalized; therefore, stable and highly-accurate detection of a moving object is realized.

Here, for example, the inter-leg information may be a temporal interval or a spatial interval of an opened state or a closed state of the legs of the moving object, and may be a temporal interval or a spatial interval indicated by a step length of the moving object. Through this, the presence or absence of a moving object is judged by the step length and the like unique to an animal with legs, so a human and the like is detected within an image with certainty.

In addition, inter-leg information extraction unit extracts, as the inter-leg information, data that indicates a temporal change in a correlation length, which is a spatial interval in which an autocorrelation value is a minimum value or a peak value, by calculating, per one-dimensional data, the correlation length, the one-dimensional data being data per unit time that forms the time series data. Through this, a periodic movement such as walking is extracted through the temporal change of the correlation length. Therefore, noise and the like with no periodicity are eliminated, periodicity analysis that is robust against noise and the like is possible, and a human and the like that carries out a movement such as walking can be detected with certainty.

In addition, the spatiotemporal data generation unit may generate time series data which indicates a spatiotemporal image in which two-dimensional images are arranged along a time axis; the moving object detection device may further include a spatiotemporal fragment extraction unit that extracts a spatiotemporal fragment, which is an image found in a cut plane or cut fragment when the spatiotemporal image is cut along the time axis; and the inter-leg information extraction unit may calculate a correlation length, which is a spatial interval in which the autocorrelation value is a minimum value or a peak value, as the one-dimensional data, the data being per unit time the spatiotemporal fragment is configured. Through this, the moving object is detected using images of the legs that move periodically in accordance with the movement, and therefore a moving object with two or more legs can be detected with high accuracy.

In addition, the moving object detection device may further include a movement direction calculation unit that calculates, from time series data generated by said spatiotemporal data generation unit, a movement direction of the moving object included in the time series data, and the spatiotemporal fragment extraction unit may cut the spatiotemporal image in accordance with the movement direction. Through this, the inter-leg information is extracted along the movement direction of the moving object. Therefore, a scope of the search required for extraction of the inter-leg information is narrowed down, and the moving object is detected in a shorter amount of time.

In addition, the spatiotemporal data generation unit may divide each image that forms the spatiotemporal data into subregions and generate an N-dimensional parameter vector which results from collecting the obtained parameters for N images, obtained by transforming each subregion into images. At this time, it is preferable for the moving object detection device to further include a time series combination generation that generates, from the N-dimensional parameter vector, a time series combination of parameter vectors, by combining parameters that have a predetermined relationship in time series, and for the inter-leg information extraction unit to extract the inter-leg information based on the time series combination. In addition, the inter-leg information extraction unit may calculate, for the time series combination, a correlation length, which is a spatial interval in which an autocorrelation value is a minimum value or a peak value, and may extract, as the inter-leg information, data that indicates a temporal change in the calculated correlation length. Through this, by using image transformation technology that is already available, it is easy to extract the inter-leg information, which is information regarding an inter-leg temporal change arising from movement of a moving object that has two or more legs.

Note that the N-dimensional parameter vector is a value indicating, for example, a frequency of the subregions, a window width, and a rotation.

In addition, the target object detection sensor is a camera that generates a two-dimensional image, the spatiotemporal data generation unit may generate the subregions by dividing the two-dimensional image into sizes determined in accordance with setting parameters of the camera, and generate the N-dimensional parameter vector for the generated subregions. Through this, the image is divided depending on a filming direction and the like of the camera. Through this, the image is divided depending on a filming direction and the like of the camera, and therefore, for example, the image is divided so that the subregions are equal in real space, enabling the regions to be uniform and the moving object to be more accurately detected.

In addition, the inter-leg information extraction unit may further generate a time series of parameters specifying a geometric figure, by applying the geometric figure that indicates a temporal change in the inter-leg area to the time series data, and to extract the inter-leg information based on the generated time series of parameters. Here, for example, two or more straight lines modeling the legs of an animal including a person are used as the geometric figure, and, for example, angles at which the straight lines intersect is used as the parameters. The inter-leg information is, for example, information indicating a temporal change in the angle, information indicating a temporal change in an angular rate of the angle, and the like. Furthermore, the periodicity analysis unit may transform the inter-leg information into a frequency and analyze the periodicity from the obtained frequency spectrum. Through this, the geometric figure modeling the legs of an animal including a person is applied, and therefore a moving object with two or more legs is more positively detected, as compared to a conventional method in which a general geometric figure, a geometric figure for the entire moving object, and the like are applied. In addition, the moving object is detected with focus on the periodicity of the parameters of the applied geometric figure rather than simply applying a geometric figure modeling the legs, and therefore the environment of the reference conditions and the initial detection accuracy have less influence as compared to conventional technology which detects a moving object by simply applying a geometric figure.

In addition, the target object detection sensor may generate images, and the spatiotemporal data generation unit may generate, as the time series data, time series image data in which the images generated by the target object detection sensor are arranged along the time axis. Here, the spatiotemporal data generation unit may generate the time series image data by carrying out background differential processing or inter-frame differential processing on the images, and the spatiotemporal data generation may to generate the time series image data by performing a Hough transform, a Fourier transform, or a wavelet transform on the images. Through this, reference fluctuation, noise, and the like are eliminated, and periodic movement such as gait is extracted from the image data; therefore, moving object detection that is robust against noise, environment fluctuation, and the like, is possible.

In addition, the movement information generation unit may specify an autocorrelation peak position in the inter-leg information, judge whether or not the moving object exists by judging whether or not the isolated peak position matches with a movement period unique to the moving object, and may generate movement information indicating the judgment result. Furthermore, the movement information generation unit may, in the case where it is judged that the moving object exists, further isolate, and generate as the movement information, a presence position and a movement direction of the moving object. Through this, not only the presence or absence but also the position and movement direction of the moving object, such as a human, is generated, so, for example, it is possible to use the moving object detection device as a human surveillance device.

Note that the present invention can be realized not only as a moving object detection device, but also as a moving object detection method, a program that causes a computer to execute that method, a computer-readable recording medium recorded with that program, and so on.

FURTHER INFORMATION ABOUT TECHNICAL BACKGROUND TO THIS APPLICATION

The disclosure of Japanese Patent Application No. 2003-390557 filed on Nov. 20, 2003 including specification, drawings and claims, the disclosure of Japanese Patent Application No. 2004-232989 filed on Aug. 10, 2004, and the disclosure of PCT Application Number PCT/JP2004/015750 filed on Oct. 18, 2004 including specification, drawings and claims, are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 20 is a diagram showing an effect of a movement direction calculation unit;

DETAILED DESCRIPTION OF THE INVENTION

Hereafter, embodiments of the present invention are described in detail using the diagrams.

First Embodiment

First, a moving object detection device according to the first embodiment of the present invention is described.

Figure 1:
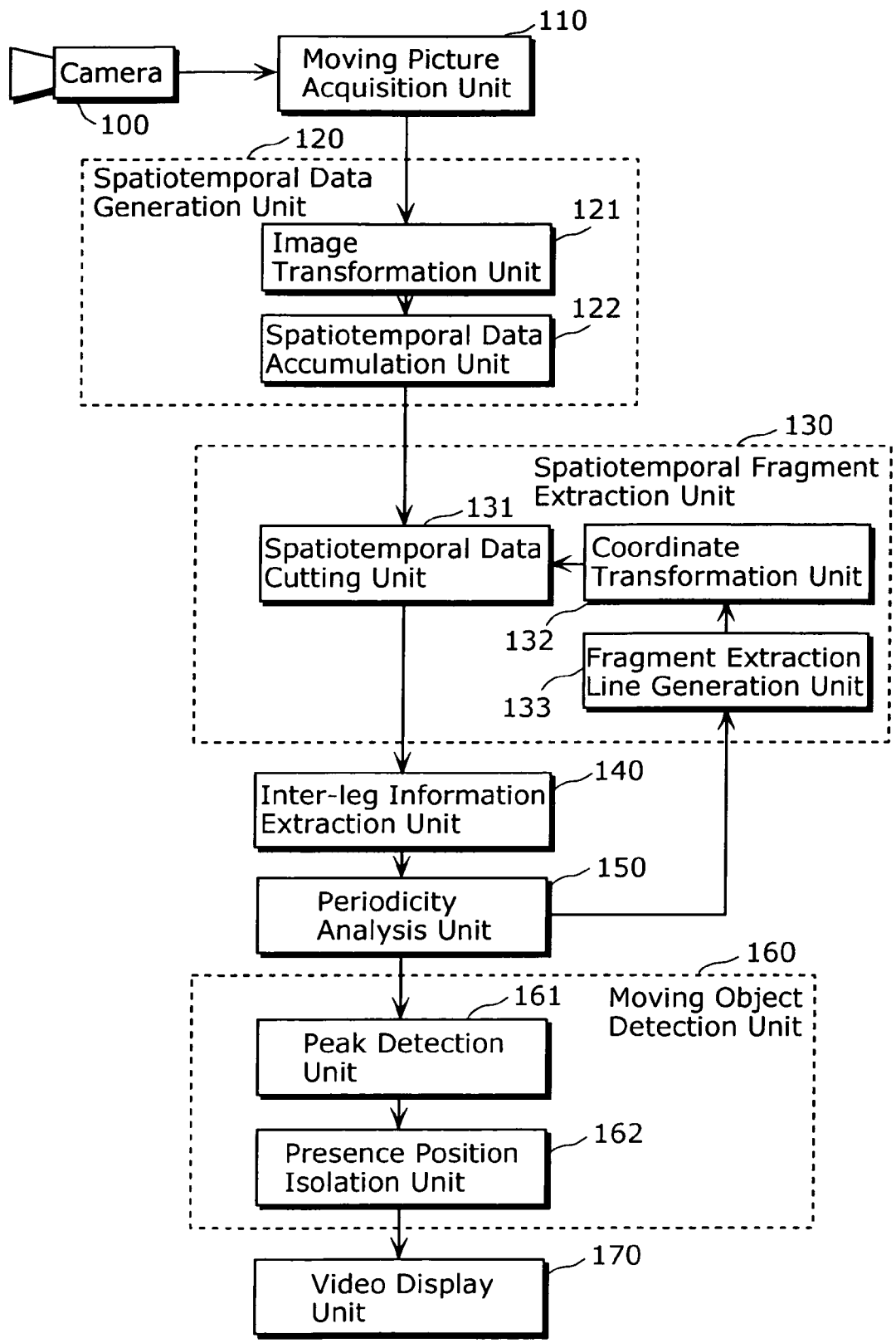
FIG. 1 is a diagram showing a configuration of a moving object detection device according to the first embodiment of the present invention.

FIG. 1 is a diagram showing a configuration of the moving object detection device according to the first embodiment of the present invention. This moving object detection device is a device that detects a moving object which exists in a video filmed in a shop, a parking lot, a city street, and so on, and includes a camera 100, a camera image acquisition unit 110, a spatiotemporal data generation unit 120, a spatiotemporal fragment extraction unit 130, an inter-leg information extraction unit 140, a periodicity analysis unit 150, a moving object detection unit 160, and a video display unit 170.

Note that the present embodiment describes the case where time series data is accumulated as an image, and a moving object is detected by analyzing the periodicity of that time series image. In addition, the configuration includes the camera and the installation parameters, but the configuration does not necessarily have to include the camera and the installation parameters. Also, in the case where moving picture data is used, that moving picture data may be saved in a recording apparatus such as magnetic tape, a hard disk, RAM, and so on, and may also be saved in a separate apparatus connected by a communications network.

The camera 100 is an example of a target object detection sensor installed one- or two-dimensionally, and is an imaging apparatus that films a moving object and outputs the obtained video to the camera image acquisition unit 110. The camera image acquisition unit 110 converts the inputted video into images per-frame, and sends these images to the spatiotemporal data generation unit 120. However, it does not necessarily have to be per frame; any device that can acquire images arranged in time series is acceptable.

The spatiotemporal data generation unit 120 is a processing unit and storage device which generates spatiotemporal data in which data indicating the target object is arranged along a temporal axis, and with emphasis on a predetermined periodicity within the image, carries out inter-frame differential processing per frame on the inputted video, or differential processing on images arranged along the temporal axis, or background differential processing. Then, the spatiotemporal data generation unit 120 converts the image into a two-dimensional image based on a threshold value, and by accumulating the post-conversion image in time order of the frames, generates spatiotemporal data using an image of a pre-determined time N amount. In the present embodiment, images are arranged in time order of the frames, and therefore a three-dimensional spatiotemporal image is generated. Note that in the generation of the three-dimensional spatiotemporal image, it is acceptable to arrange every few frames rather than arranging every one frame.

The spatiotemporal fragment extraction unit 130 is a processing unit that extracts a spatiotemporal fragment by cutting the spatiotemporal image, indicated by the spatiotemporal data accumulated by the spatiotemporal data generation unit 120, parallel to the temporal axis. Here, the spatiotemporal fragment is an image found in a cut plane or cut fragment when the three-dimensional image (spatiotemporal image) indicated by the spatiotemporal data is cut along the temporal axis. For example, the spatiotemporal fragment is an image found in a cut plane when the spatiotemporal image is cut parallel to the horizontal axis of each frame constituting the spatiotemporal image as well as on a plane parallel to the temporal axis; at this time, the image is a two-dimensional image made up of the horizontal axis of the frame and the temporal axis. Note that the cut fragment is equivalent to a cut plane that has a thickness, and an image found in the cut fragment is a three-dimensional image. For example, a spatiotemporal fragment obtained through a cut plane that has cut the two legs of a person shows a two-dimensional image that indicates the spatial and temporal movement of the two legs.

The inter-leg information extraction unit 140 is a processing unit that extracts, from spatiotemporal fragment extracted by the spatiotemporal fragment extraction unit 130, information regarding an area between the legs (referred to as "inter-leg information") which is generated by two or more legs in each time. In the present embodiment, the inter-leg information is, for example, information indicating a temporal change in the area between two legs of a moving object (the inter-leg area).

The periodicity analysis unit 150 is a processing unit that carries out periodicity analysis on the inter-leg information extracted by the inter-leg information extraction unit 140, in order to detect a periodicity that appears in the movement of the moving object. The periodicity analysis unit 150 outputs periodicity data that shows the analysis results to the moving object detection unit 160.

The moving object detection unit 160 is a processing unit which, based on the periodicity data outputted from the periodicity analysis unit 150, judges whether or not a moving object that has two or more legs exists within the target video, as well as isolating the presence position and movement direction of that moving object in the case where the moving object is judged as existing. The moving object detection unit 160 generates the detection results as movement information, and outputs the movement information to the video display unit 170.

The video display unit 170 is an LCD and the like which displays the detection results of the moving object detection unit 160, and displays the presence position and movement direction of the moving object in a downward-view diagram.

Here, the spatiotemporal data generation unit 120 includes an image conversion unit 121 and a time series data accumulation unit 122. The image conversion unit 121 is a computation unit that carries out inter-frame differential processing or background differential processing per frame and binarizes the video based on a threshold value. The time series data accumulation unit 122 is a memory and the like that, in order to generate the spatiotemporal data, accumulates the images binarized by the image conversion unit 121 as a buffer in time order.

The spatiotemporal fragment extraction unit 130 is a processing unit that determines parameters of the fragment extraction line, and uses the determined fragment extraction line to extract the spatiotemporal fragment from the spatiotemporal data generated by the spatiotemporal data generation unit 120. The spatiotemporal fragment extraction unit 130 includes: a fragment extraction line generation unit 133, which determines the fragment extraction line, which cuts the spatiotemporal data, in the world coordinate system, which is a coordinate axis that represents actual space, in order to detect the presence position and movement direction of the moving object; a coordinate transformation unit 132, which uses parameters regarding the installation of the camera 100 and carries out transformation from the world coordinate system to a pixel coordinate system, which expresses an image plane; and a spatiotemporal data cutting unit 131, which carries out extraction of the spatiotemporal fragment from the spatiotemporal data.

Note that the inter-leg information extraction unit 140 is aimed at extracting relative inter-leg space, not position information of the legs, in the spatiotemporal fragment, and calculates an autocorrelation function every t time, and calculates respective correlation lengths. The periodicity analysis unit 150 calculates, again, an autocorrelation function on the time series data of the correlation length, where each calculated correlation length is arranged in time direction.

In addition, the moving object detection unit 160 further detects a peak position from the autocorrelation function of the correlation length inputted from the periodicity analysis unit 150, and includes: a peak detection unit 161 which judges whether or not there is a moving object by verifying whether or not the detected peak position matches with the movement period of the moving object; and a presence position isolation unit 162, which, in the case where a moving object is judged, isolates and outputs, to the video display unit 170, the presence position and movement direction of the moving object.

Figure 2:
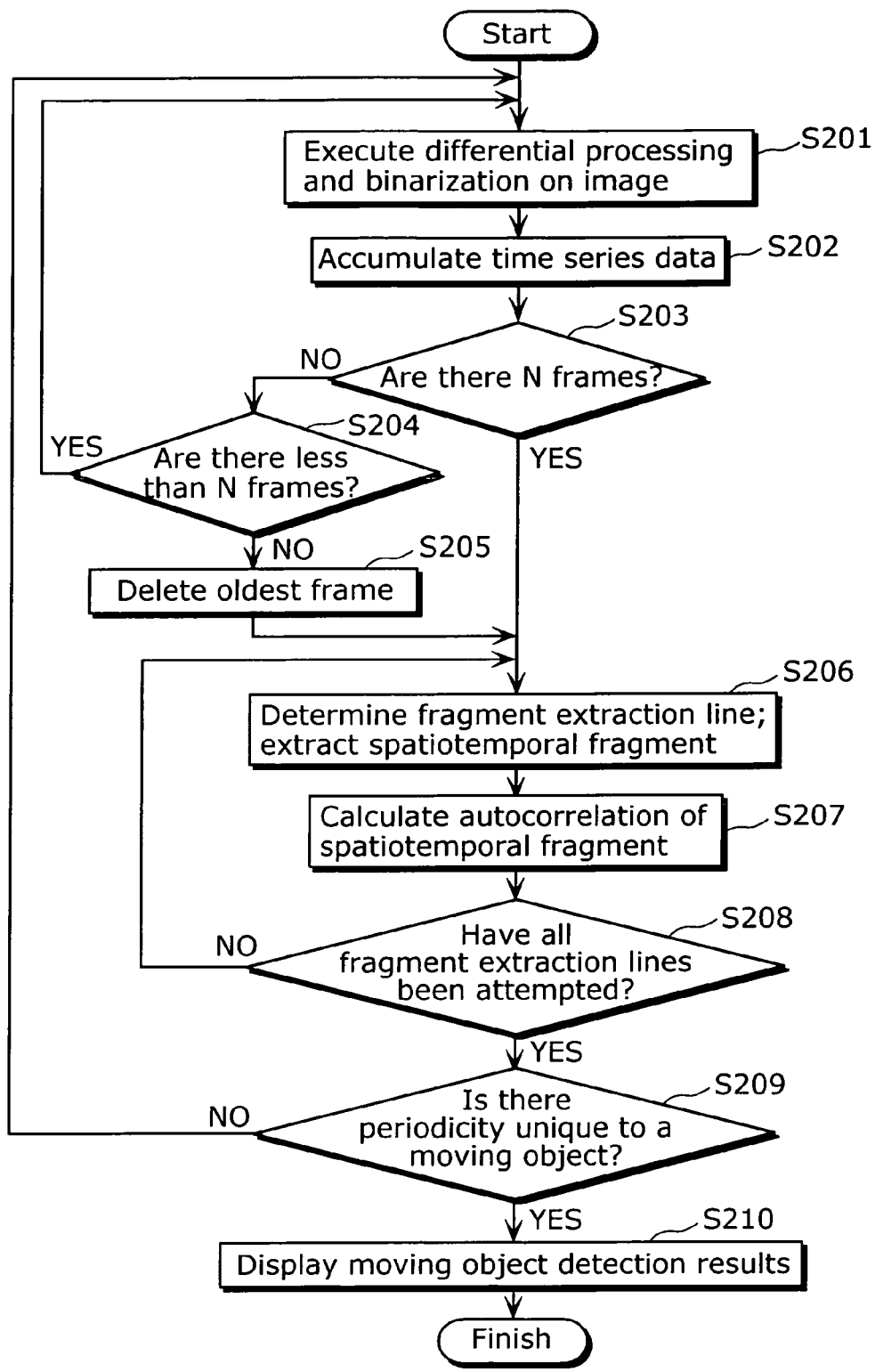
FIG. 2 is a flowchart showing an operation of the moving object detection device.

Next, the flowchart in FIG. 2 is used to describe, in detail, an operation of the moving object detection device according to the present embodiment and configured in the abovementioned manner.

First, in S201, the image conversion unit 121 carries out inter-frame differential processing or background differential processing per-frame on a video filmed by the camera 100, which is acquired by the camera image acquisition unit 110, and binarizes the video based on a threshold value. Note that in the case where background differential processing in carried out, a background image in which a moving object does not exist is prepared in advance. Also note that the camera 100 may be composed of a plurality of camera 100s.

In S202, the time series data accumulation unit 122 accumulates the binarized images in time order as a buffer, in order to generate the spatiotemporal data. Note that the configuration of the spatiotemporal data generation unit may take on a configuration that differs from that of the present embodiment.

In S203, the time series data accumulation unit 122 uses an image or parameters and generates the spatiotemporal data; the process moves to S206 in the case where image frames of time N amount (N being a natural number) are accumulated, and the process moves to S204 in the case where image frames of time N amount are not accumulated.

In S204, the process moves to S201 in the case where there are less image frames than time N amount, and the process moves to S205 in the case where there are more image frames time N amount.

In S205, the time series data accumulation unit 122 constantly generates the spatiotemporal data which holds images of N frame amount by canceling the first image from the spatiotemporal data in S205, in the case where the first image after N is sent from the image conversion unit 121.

Note that the generation method of the spatiotemporal data is described later. Here, it is not necessary to input and cancel one image at a time; any process is acceptable as long as it acquires data arranged temporally of time N amount. In addition, in the case where moving picture data is used, the data may be saved on magnetic tape, in a hard disk, and in RAM, and may be saved in a data holding unit within a network. Here, the video does not need to be on a per-frame basis, but may be a video sampled at a constant time.

In S206, the spatiotemporal fragment extraction unit 130 determines the parameters of the fragment extraction line, and uses the determined fragment extraction line to extract the spatiotemporal fragment from the spatiotemporal data generated by the spatiotemporal data generation unit 120. In addition, in the present embodiment, the case where the spatiotemporal fragment is processed as-is without being divided is described, but it is also acceptable to divide the spatiotemporal fragment into subregions and carry out the processing described below per divided region.

Figure 3A:
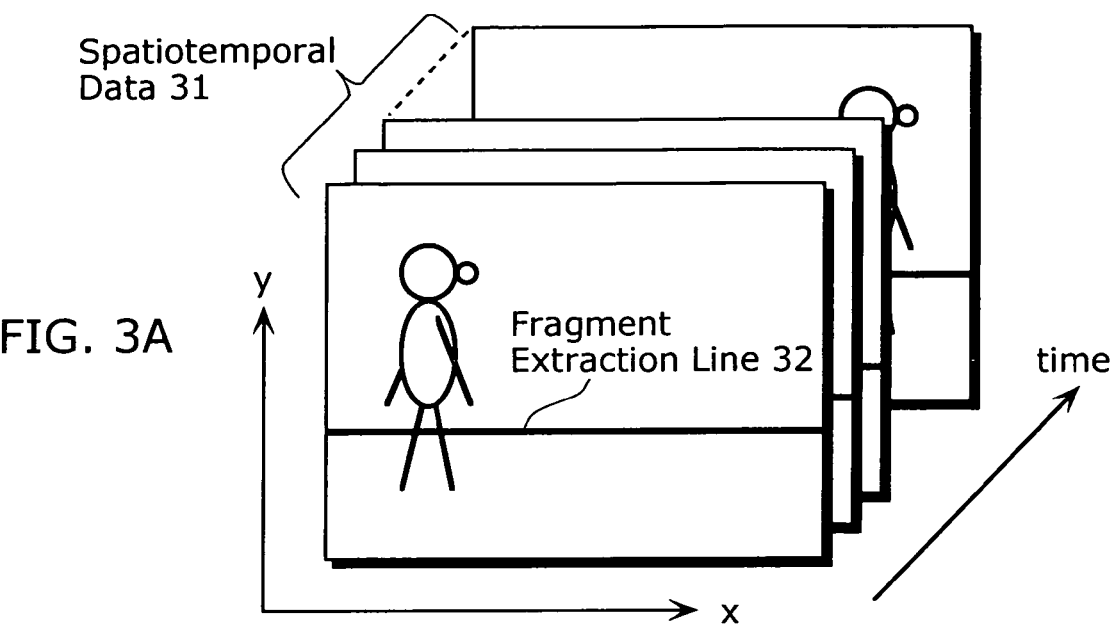
FIG. 3A is a diagram showing spatiotemporal data.
Figure 3B:
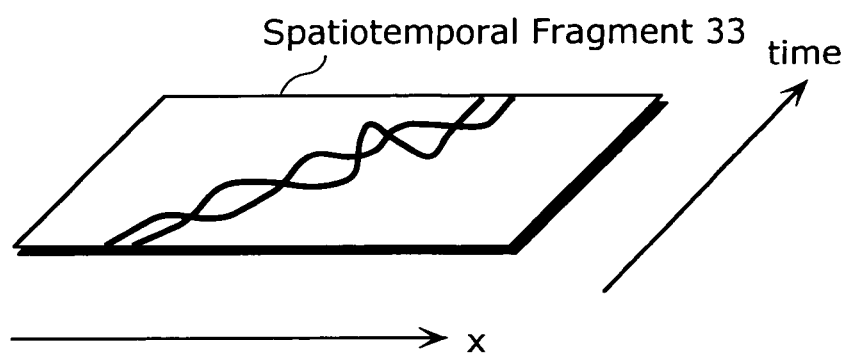
FIG. 3B is a diagram showing a spatiotemporal fragment.

Here, a method for creating the spatiotemporal fragment is described using FIG. 3. FIG. 3A shows spatiotemporal data 31, and FIG. 3B shows a spatiotemporal fragment 22 determined by a fragment extraction line 32.

Here, the fragment extraction line 32 for generating the fragment may use a curved line as opposed to a straight line, and may also be a line with a constant thickness. Note that a method for determining the fragment extraction line 32 is described later.

In S207, the inter-leg information extraction unit 140 carries out calculation of the autocorrelation function in order to carry out periodicity analysis on the spatiotemporal fragment extracted in S206. A method for analyzing the periodicity and calculation of the autocorrelation function are described later. In addition, the processing of the inter-leg information extraction unit 140 may be any processing as long as it detects information relative to that of two or more legs. For example, it is acceptable to detect, as the inter-leg information, a time interval or a space interval when the legs of the moving object are in a closed state or an opened state, and it is acceptable to detect, as the inter-leg information, a time interval or a space interval that indicates a step length of the moving object.

In S208, the process moves to S209 in the case where the periodicity analysis unit 150 has examined all parameters of the fragment extraction line 32, and the process moves to S206, repeating the processing from S206 to S208, in the case where the periodicity analysis unit 150 has not examined all parameters of the fragment extraction line 32.

In S209, the moving object detection unit 160 judges the presence/absence of periodicity unique to a moving object from the periodicity analysis results of the spatiotemporal fragment 33 calculated by the periodicity analysis unit 150. The process moves to S210 in the case where there is periodicity unique to a moving object, and the process moves to S201 in the case where there is not periodicity unique to a moving object. Note that a method for determining whether or not the object is a moving object is described later.

Finally, in S210, the video display unit 170 displays results based on the presence position and movement direction of the moving object detected by the moving object detection unit 160.

Next, the spatiotemporal fragment extraction unit is described in more detail.

The structure of the spatiotemporal fragment extraction unit 130 differs depending on the purpose of the moving object detection. The purpose refers to whether the presence position and movement direction of a moving object in real space is detected, or the presence position and movement direction of a moving object in the image is detected. Here, the purpose is to detect the presence position and movement direction of a moving object in real space.

Hereafter, the case where a straight line is generated as the fragment extraction line is described. First, the fragment extraction line generation unit 133 defines a straight line and a curved line in world coordinates. Here, the fragment extraction line generation unit 133 uses the world coordinate system, which expresses coordinate axes in real space, in order to generate the straight line and curved line based on the presence position and movement direction of the moving object in real space.

Figure 4:
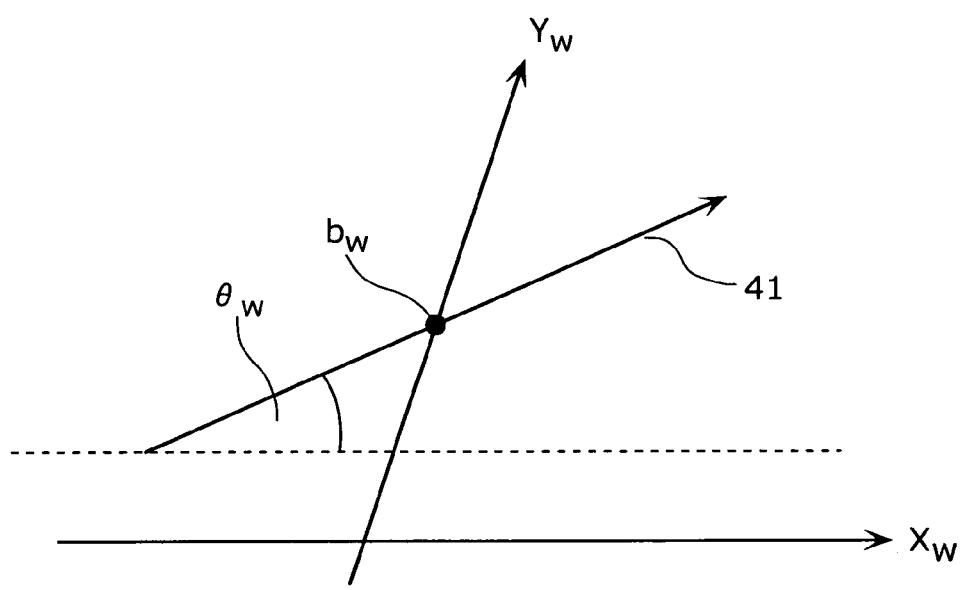
FIG. 4 is a diagram showing a fragment extraction line in world coordinates.

Note that world coordinates are indicated by ($X_w$, $Y_w$, and $Z_w$), and details can be found on page 9 of Xu, Tsuji, *Three-Dimensional Vision,* Kyoritsu: 1998. When $Z_w$ is assumed as being a vertical direction in world coordinates and as being a constant value, the fragment extraction line 41 in world coordinates, as shown in FIG. 4, can be defined by equation 1.

$$y_w = x_w \tan \theta_w + b_w, \quad z_w = \text{const} \qquad \text{(Equation 1)}$$

Here, $\theta_w$ is a parameter regarding the movement direction of the moving object existing in the world coordinates the represent real space, and a cut fragment $b_w$ is a parameter regarding the presence position of the moving object in world coordinates. Note that it is possible to use a curved line as the fragment extraction line 41. In addition, the two parameters take on a combination which completely covers the surveillance area, and the spatiotemporal fragment 33 is generated according to those parameters. The generated spatiotemporal fragment 33 is sent to the inter-leg information extraction unit 140, described later, and the periodicity analysis unit 150, and analysis of the periodicity is carried out. Note that in the case where another detection method is used in parallel, it is acceptable to determine the two parameters based on that detection result, and the results do not have to be exhaustive. An embodiment in the case where another detection method is used in parallel is described in the fourth embodiment.

The coordinate transformation unit 132 uses already-known parameters such as the installation position, focal length, and scale factor of the camera 100, and transforms the fragment extraction line 41 generates by the parameters of $\theta_w$ and $b_w$ from the world coordinates system to the pixel coordinates system, which expresses an image plane. Through this transformation, the fragment extraction line 41 becomes a line in a two-dimensional image. Note that the coordinate transformation unit 132 is not necessary in the case where the world coordinate system is not defined.

The spatiotemporal data cutting unit 131 carries out extraction of the spatiotemporal fragment 33. The extraction of the spatiotemporal fragment 33 is carried out by using the fragment extraction line 41 in the pixel coordinate system as generated by the coordinate transformation unit 132 to cut the spatiotemporal data 31 generated by the spatiotemporal data generation unit 120.

The inter-leg information extraction unit 140 calculates, from the spatiotemporal fragment 33, a distance equivalent to the inter-leg area, and the periodicity analysis unit 150 carries out analysis of that periodicity. When that periodicity analysis ends, a fragment extraction line parameter change signal, which is a signal indicating a parameter change in the fragment extraction line 41, is outputted to the fragment extraction line generation unit 133.

Thereafter, in the same manner, the spatiotemporal fragment extraction unit 130 creates the fragment extraction line 41 and the spatiotemporal fragment 33, until inputting of the fragment extraction line parameter change signal ends.

Next, the inter-leg information extraction unit 140 is described in detail.

Figure 5A:
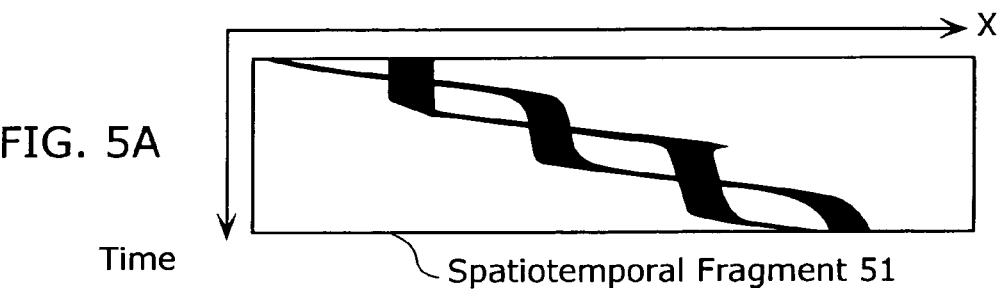
FIG. 5A is a diagram showing a spatiotemporal fragment.
Figure 5B:
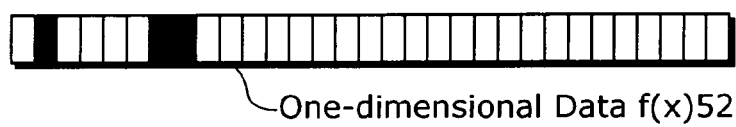
FIG. 5B is a diagram showing one-dimensional data.

The inter-leg information extraction unit 140 creates one-dimensional data 52 per t time, as shown in the example in FIG. 5B, for a spatiotemporal fragment 51 as shown in FIG. 5A, and calculates an autocorrelation function 53 for each one-dimensional data. Note that time in FIG. 5A is a frame number N pre-determined by the spatiotemporal data generation unit 120. Length in FIG. 5B is a range X of the spatiotemporal fragment 51 as shown in FIG. 5A. Calculation of the autocorrelation function 53 can be defined by equation 2.

$$c(\tau) = \lim_{X \to \infty} \frac{1}{X} \int_{-\frac{X}{2}}^{\frac{X}{2}} f(x)f(x+\tau)dx \quad \text{(Equation 2)}$$

Figure 5C:
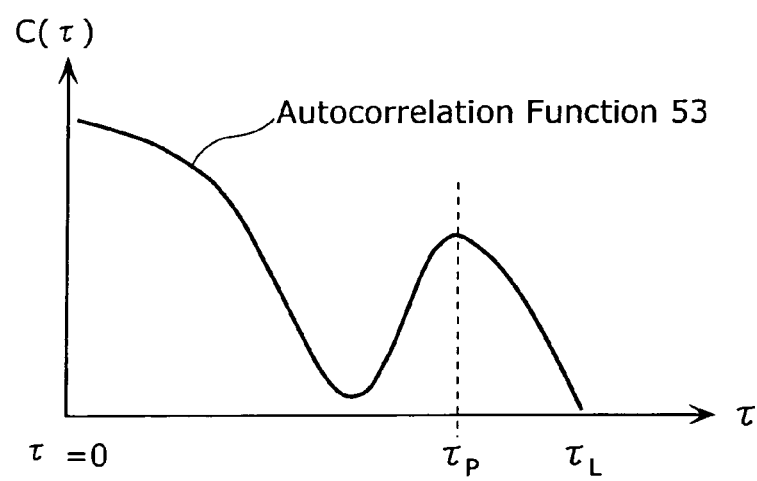
FIG. 5C is a diagram showing an autocorrelation function.

Here, f(x) is the one-dimensional data 52, and C($\tau$) is the autocorrelation function 53. In other words, the autocorrelation function C($\tau$) is a measurement of how much one-dimensional data f(x) sheared an interval $\tau$ (f(x+$\tau$)) resembles the original one-dimensional data f(x). A relationship between the autocorrelation function C($\tau$) and $\tau$ is shown in FIG. 5C. An autocorrelation function C(0) takes on a maximum value in order to indicate a correlation with itself. In addition, an autocorrelation function C($\tau$p) is a position $\tau$p where the autocorrelation function C($\tau$) peaks, and an interval of an ON pixel with a high correlation in the one-dimensional data is equivalent to $\tau$p. In the case where one focuses on the legs of the moving object, the position $\tau$p, which is a peak in the autocorrelation function C($\tau$), indicates the length of step (inter-leg area in a certain time). In other words, it can be expected that a temporal change in the autocorrelation function C($\tau$) indicates a temporal change in the length of step (inter-leg area) in the movement, and is the periodicity.

In the present embodiment, considering that there are cases in which a peak such as the autocorrelation function C($\tau$p) does not necessarily exist, analysis of the periodicity is carried out using a position $\tau_L$ where the autocorrelation function C($\tau$)=0. This arises when the legs are in a closed state. Also, hereafter, $\tau_L$ is called a correlation length. Note that in the present embodiment, the position $\tau_L$ when the autocorrelation function C($\tau$)=0 is the correlation length, but the correlation length does not necessarily have to be the position $\tau_L$ when the autocorrelation function C($\tau$)=0. Anything is acceptable as long as the periodic fluctuation of the length of step can be ascertained.

Figure 6A:
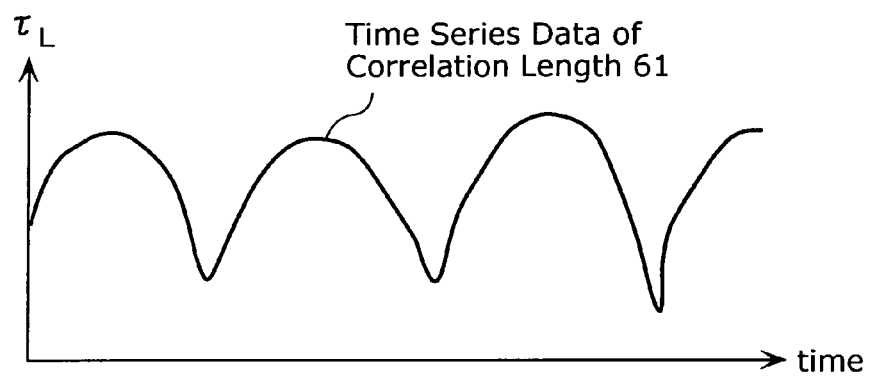
FIG. 6A is a diagram showing time-series data of a correlation length.

The correlation length $\tau_L$ is calculated per time, and by arranging, in time order, the correlation lengths $\tau_L$ calculated per time, time-series data 61 of the correlation length is obtained. The time series data 61 of the correlation length $\tau_L$ is shown in FIG. 6A. The time series data 61 of the correlation length $\tau_L$ is, in the case where an ideal spatiotemporal fragment is inputted, equivalent to a temporal fluctuation in the length of step, and fluctuates periodically according to the time. Note that the correlation length $\tau_L$ does not necessarily have to be calculated temporally in a continuous manner; it is acceptable to calculate the correlation length $\tau_L$ of at least one time amount per one step.

Next, the periodicity analysis unit 150 is described in detail.

Figure 6B:
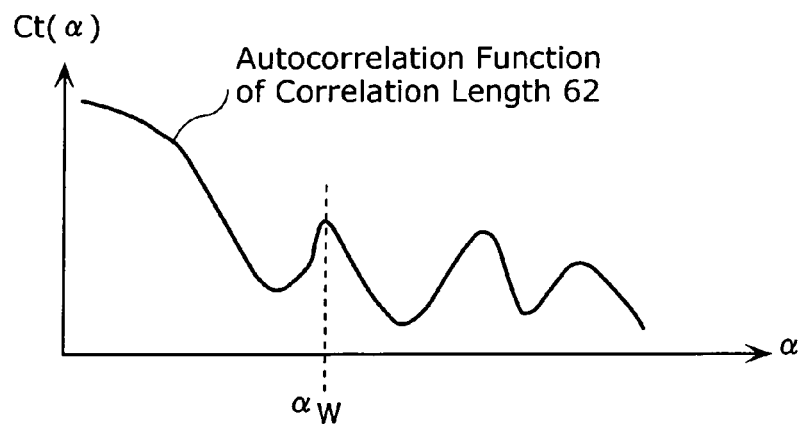
FIG. 6B is a diagram showing an autocorrelation function of a correlation length.

The time series data 61 of the correlation length $\tau_L$ calculated by the inter-leg information extraction unit 140 is inputted into the periodicity analysis unit 150. The periodicity analysis unit 150 calculates an autocorrelation function 62 on the time series data 61 of the correlation length $\tau_L$ shown in FIG. 6A. The formula is the same as the aforementioned equation 2. Note that here, a Fourier transform may be used instead of an autocorrelation function. The results of these calculations are shown in FIG. 6B. Here, Ct($\alpha$), which is the result of calculating the autocorrelation function on the time series data 61 of the correlation length $\tau_L$, is outputted to the moving object detection unit 160. In addition, at the same time, the periodicity analysis unit 150 outputs the fragment extraction line parameter change signal, which is a signal indicating a parameter change, to the fragment extraction line generation unit 133 of the spatiotemporal fragment extraction unit 130, in order to extract the spatiotemporal fragment.

Thereafter, in the same manner, the fragment extraction line generation unit 133 of the spatiotemporal fragment extraction unit 130 creates the spatiotemporal fragment in accordance with the parameters from the spatiotemporal data, until inputting of the fragment extraction line parameter change signal ends. Note that the fragment extraction line parameter change signal may change all the fragment extraction line parameters in order to completely cover the surveillance area, and it is also acceptable to change the fragment extraction line parameters until moving object detection is carried out by the moving object detection unit 160. In addition, in the case where another detection method is used in parallel, it is not necessary to exhaustively change the parameters of the fragment extraction line. The fragment extraction line parameter change signal is $\theta_w$ and $b_w$, which are parameters of the fragment extraction line.

Next, the moving object detection unit 160 is described in detail.

The moving object detection unit 160 includes: a peak extraction unit 161, which detects a peak position $\alpha_w$ from the autocorrelation function Ct($\alpha$) of the correlation length inputted from the periodicity analysis unit 150, and judges whether or not an object is a moving object by verifying whether or not the detected peak position $\alpha_w$ matches with the movement period of a moving object; and a presence position isolation unit 162, which, in the case of judging to be a moving object, isolates and outputs, to the video display unit 170, the presence position and movement direction of the moving object.

The autocorrelation function Ct($\alpha$) of the correlation length is a measurement of how much $\tau_L$(t+$\alpha$), in which $\tau_L$(t) is sheared an interval $\alpha$, resembles $\tau_L$(t). In the present embodiment, detection of the peak position $\alpha_w$ is carried out by searching from a position $\alpha$=0 and detecting the first peak. However, it is acceptable to use another peak detection method, and acceptable to use a method which searches for a peak in the vicinity of a frame number determined by the designer, described later.

In the present embodiment, the case in which the movement period of one step amount of movement is detected, is described. The peak detection unit 161 of the moving object detection unit 160 judges that an object is a moving object in the case where the peak position $\alpha_w$ is the frame number necessary for one step of movement. The frame number necessary for one step of movement differs depending on how many frames can be acquired in one second by the camera image acquisition unit 110. However, in the present embodiment, in the case where 30 frames are inputted in one second, 20 to 30 frames is the frame number necessary for one step of movement, and an object is judged to be a moving object when a peak of the autocorrelation function $Ct(\alpha)$ of the correlation length, when the peak position $\alpha$ is between 20 and 30 frames, is detected. This frame number can be freely determined by the designer.

Note that it is possible to detect periodicity using two or more steps as one unit, in the case where moving object judgment is carried out at a higher level of precision. In such a case, the frame number determined by the designer can be made applicable by multiplying the amount of steps. In addition, in the case of detecting an animal such as a dog or a cat, it is possible to judge the periodicity in the same manner. In addition, it is also possible to use a Fourier transform instead of calculating the autocorrelation function $Ct(\alpha)$. In this case, it is judged whether or not a peak exists in a specific frequency.

In addition, in the present embodiment, the case where images are inputted on a per-frame basis is described, but it is also acceptable to use images sampled within a set time. In such a case, it is acceptable to calculate the peak position $\alpha_w$ of the peak detection unit 161 from the time necessary for the moving object to move one step.

In the case where a peak unique to the movement of a moving object is detected from the autocorrelation function of the correlation length, the peak detection unit 161 isolates, through the presence position isolation unit 162, and outputs, to the video display unit 170, the presence position and movement direction of the moving object through the presence position isolation unit 162.

Figure 7:
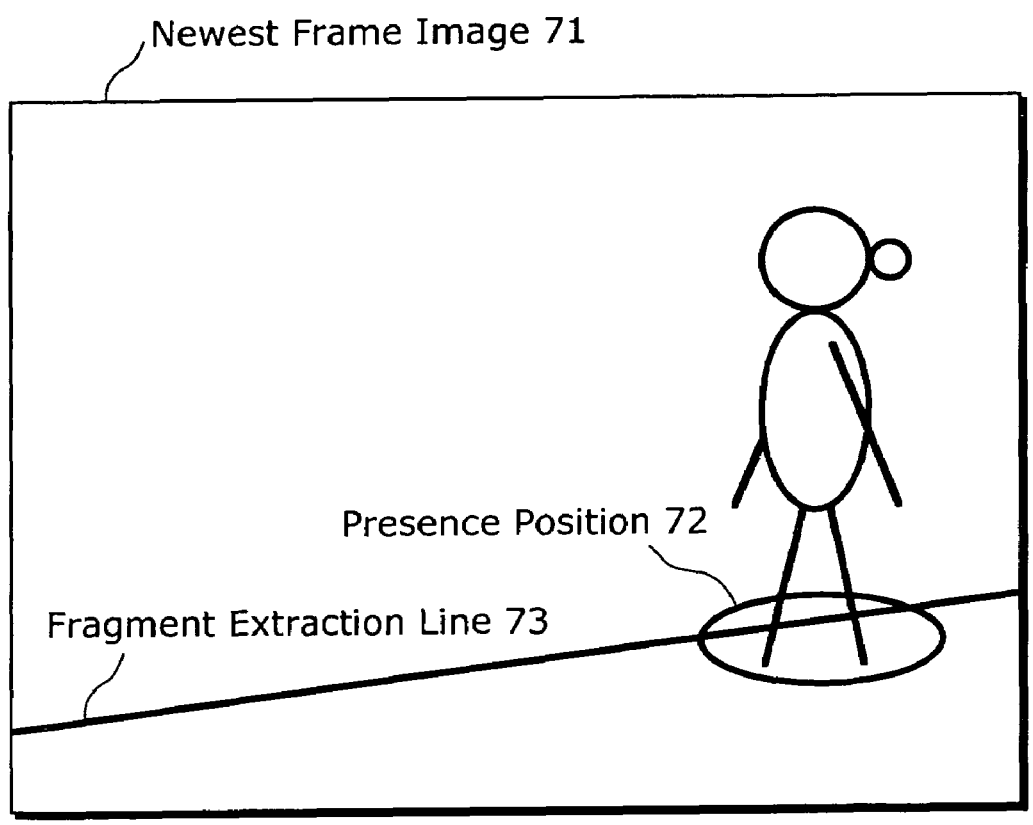
FIG. 7 is a diagram showing a moving object presence position.

The presence position isolation unit 162 first isolates the movement direction in world coordinates, which indicate real space, from $\theta_w$ among $\theta_w$ and $b_w$, which are the parameters of the fragment extraction line. Here, because $\theta_w$ and $b_w$ express a movement trajectory in real space, it is possible to detect the movement direction from $\theta_w$. As shown in FIG. 7, a presence position 72 of the moving object is determined from a contact point of a binarized image of a newest frame image 71 and a fragment extraction line 73. Through this, it is possible to detect the presence position 72 in the image. In addition, by transforming the detected presence position 72 to a position in world coordinates, it is also possible to isolate the presence position 72 in real space.

Note that, as mentioned earlier, in the case where it is highly possible that a plurality of moving objects exist within the surveillance area, by dividing the spatiotemporal fragment into subregions and carrying out processing, the influence of overlapping of moving objects and so on is diminished, and it is possible to realize accurate moving object detection. However, this does not limit the method for isolating the presence position 72.

Finally, the video display unit 170 arranges and displays the presence position 72 and movement direction of the moving object as detected by the moving object detection unit 160 in a downward-view diagram. Note that it is also possible to display the detected position and movement direction in a camera image. Through this, it is possible to simultaneously detect the time, position, and movement direction in which a moving object that has periodic movement exists.

As described above, in the present embodiment, a moving object is detected according to periodicity analysis, which is based on the state in which the moving object has its legs closed or the state in which the moving object has its legs opened, using a plurality of images. Therefore, even in the case where initial detection cannot be carried out in an ideal manner, it is possible to carry out stable detection of a moving object without mistakenly identifying another moving object. In addition, it is possible to detect the movement direction at the same time as the presence position of the moving object.

Note that the present process does not limit the method for searching the fragment extraction line parameters.

Also, in the present embodiment, a moving object such as a human is the target of detection, but it is possible to obtain the same effects as long as the moving object is something that moves via two or more legs (such as an animal).

Second Embodiment

Next, a moving object detection device according to the second embodiment of the present invention is described.

In the present embodiment, the following case is described: image transformation is carried out on an inputted image; post-transformation parameters are accumulated as time series parameters; and a moving object is detected by analyzing a periodicity of those time series parameters. In addition, the case where a moving object is detected from a moving picture saved on a videotape and so on is described; however, as described in the first embodiment, the configuration in FIG. 1, including a camera 100 and the installation parameters, is also possible.

Figure 8:
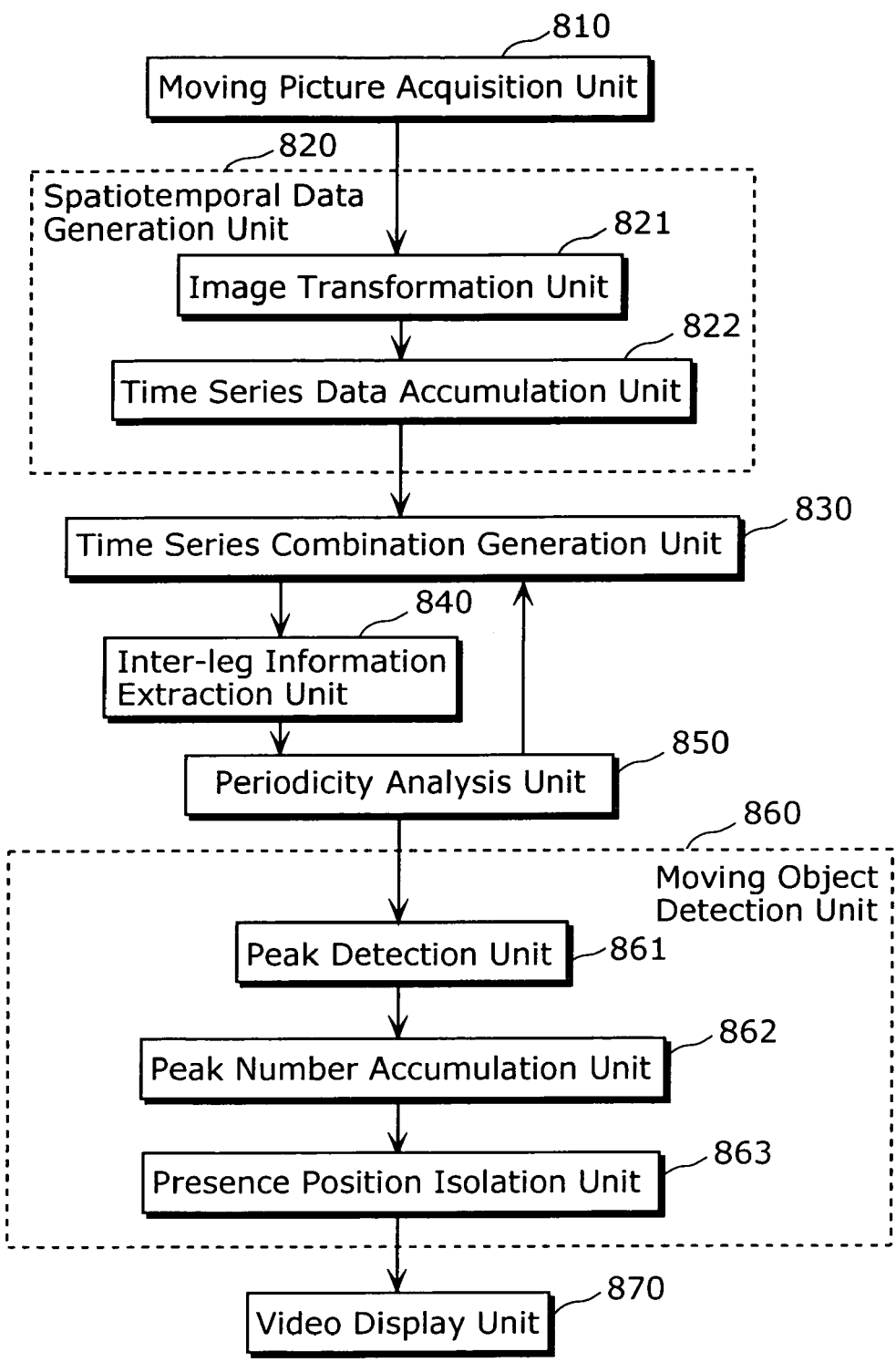
FIG. 8 is a diagram showing a configuration of a moving object detection device according to the second embodiment of the present invention.

FIG. 8 is a diagram showing a configuration of the moving object detection device according to the present invention. This moving object detection device is, as in the first embodiment, a device that detects a moving object which exists in a video filmed in a shop, a parking lot, a city street, and so on, but has a characteristic of carrying out image transformation on an inputted image, accumulating post-transformation parameters as time series parameters, and detecting a moving object by analyzing a periodicity of those time series parameters. The moving object detection device includes: a moving picture acquisition unit 810; a spatiotemporal data generation unit 820; a time series combination generation unit 830; an inter-leg information extraction unit 840; a periodicity analysis unit 850; a moving object detection unit 860; and a video display unit 870.

Note that in the first embodiment, the case described is the case where the time series data is accumulated as images and the moving object is detected by analyzing a periodicity from those time series images. However, in the present embodiment, the case described is the case where a predetermined periodicity in the images is emphasized, and in an image transformation unit 121, image transformation is carried out, and the images are parameterized. Through this, it is possible to realize a moving object detection device robust against noise and so on.

The moving picture acquisition unit 810 is a signal interface or the like which acquires a video, recorded on a video tape and so on, as a moving picture on a per-frame basis. The acquired images are sent to the spatiotemporal data generation unit 820 per frame. In addition, in the case where moving picture data is used, the data may be saved on magnetic tape, in a hard disk, and in RAM, and may be saved in a data holding unit within a network. Here, the video does not need to be on a per-frame basis, but may be any video that can be acquired arranged in time series; for example, the video may be sampled in a set time interval.

The spatiotemporal data generation unit 820, in the same manner as in the first embodiment, includes an image transformation unit 821 and a time series data accumulation unit 822. The image transformation unit 821 divides the inputted video into subregions, carries out image transformation on a per-subregion basis, and transforms each subregion image into parameters. The time series data accumulation unit 822 is a memory and the like that generates spatiotemporal data using a parameter vector of time N amount.

Note that in the present embodiment, the case described is the case where a predetermined periodicity in the images is emphasized, the image is wavelet-transformed, and data transformed into a multidimensional wavelet coefficient is arranged in the frame time order. However, the data does not necessarily have to be arranged per-frame; it is acceptable as long as the data is arranged in time order.

The time series combination generation unit 830 is a processing unit that generates a combination of subregions in time order from the parameter vector, after each wavelet transform is carried out on the subregions divided by the image transformation unit 821.

The inter-leg information extraction unit 840 extracts information corresponding to an angle and distance raised by the inter-leg area, from the time series combination data of the parameter vector corresponding to each subregion generated by the time series combination generation unit 830.

The periodicity analysis unit 850 is a processing unit that carries out periodicity analysis on the spatiotemporal data generated by the spatiotemporal data generation unit 820, in order to detect a periodicity appearing particularly in movement of the moving object, and detects a periodicity unique to a moving object that has legs.

The moving object detection unit 860 is a processing unit and storage device which is inputted with periodicity data calculated by the periodicity analysis unit 850, and from that periodicity data, judges whether or not an object is a moving object. The moving object detection unit 860 includes a peak detection unit 861, a peak number accumulation unit 862, and a presence position isolation unit 863.

The peak detection unit 861 is a processing unit which detects a peak position from the periodicity analysis results inputted from the periodicity analysis unit 850, and verifies the similarity of a movement cycle of the moving object, using the detected peak position. The peak number accumulation unit 862 is a processing unit and storage device that carries out peak detection in multi-dimensional vector calculated from image frames of time N amount, and accumulates the detected peak number. The presence position isolation unit is a processing unit that isolates and outputs, to the video display unit 870, the presence position and movement direction of the moving object, in the case of judging the moving object.

The video display unit 870 is an LCD and the like which shows the detection results, and displays the presence position and movement direction of the moving object in a downward-view diagram.

Figure 9:
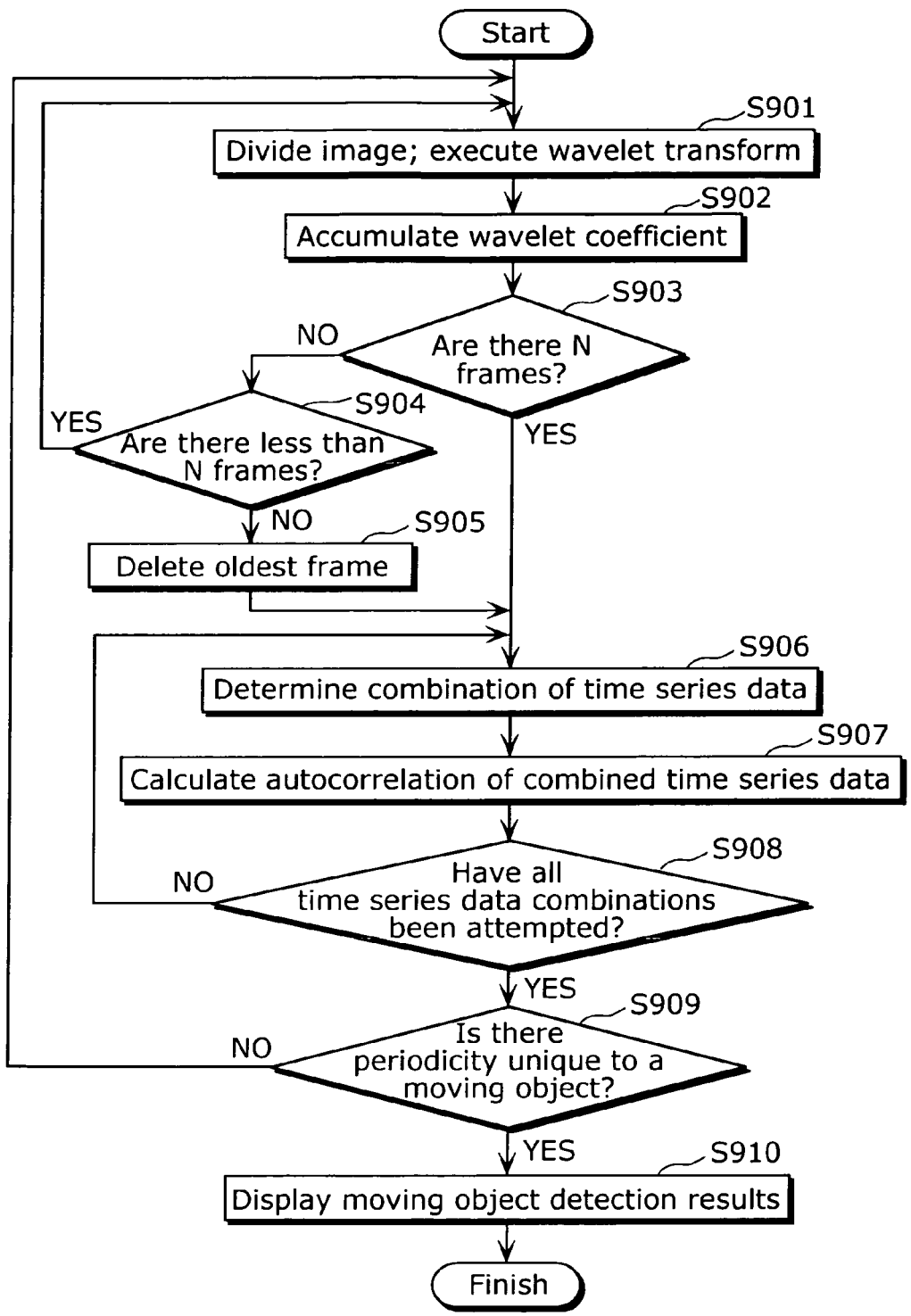
FIG. 9 is a flowchart showing an operation of the moving object detection device.

Next, the flowchart in FIG. 9 is used to describe, in detail, an operation of the moving object detection device according to the present embodiment and configured in the abovementioned manner.

First, in S901, the moving picture acquisition unit 810 acquires a moving picture, and outputs the moving picture to the spatiotemporal data generation unit 820. The image transformation unit 821 of the spatiotemporal data generation unit 820 divides the inputted image into subregions, and carries out wavelet transforms on each of the regions. The wavelet transform is described later.

Note that it is also acceptable to carry out interframe differential processing or background differential processing per-frame and transform the image into a binary image based on a threshold value, and divide the post-transformation image into subregions and carry out wavelet transforms. In the case where background differential processing in carried out, a background image in which a moving object does not exist is prepared in advance. In addition, in the present embodiment, the case where a wavelet transform is used by the image transformation unit 821 is described, but it is also possible to use a Hough transform or a two-dimensional Fourier transform.

In S902, the time series data accumulation unit 822 of the spatiotemporal data generation unit 820 accumulates a time series of the parameter vector post-wavelet transform as spatiotemporal data in a buffer in time order. Note that the configuration of the spatiotemporal data generation unit 820 differs depending on the embodiment.

In S903, the time series data accumulation unit 822 generates the spatiotemporal data using the parameter vector of a pre-determined time N amount, and in the case where the time N amount of image frames are stored, the process moves to S906, while in the case where the time N amount of image frames are not stored, the process moves to S904.

In S904, in the case where the image frames are less than the time N amount, the process moves to S901, and in the case where the image frames exceed the time N amount, the process moves to S905.

In S905, in the case where the parameter vector generated from the N+1th image frame from the image transformation unit 821, the time series data accumulation unit 822, in S905, constantly generates the spatiotemporal data which holds a parameter vector of N time amount by canceling the parameter vector generated from the first image frame from the spatiotemporal data.

Note that a method for generating the spatiotemporal data is described later. Here, it is not necessary to input and cancel one image at a time; any process is acceptable as long as it acquires data arranged temporally of time N amount. In addition, the data may be data sampled per set time.

In S906, the time series combination generation unit 830 generates a combination of subregions in time order from the parameter vector of after each wavelet transform is carried out on each subregion. Note that the time series combination generation unit 830 is described later.

In S907, the inter-leg information extraction unit 840 carries out calculation of an autocorrelation function in order to carry out analysis of the periodicity, on the time series combination of parameter vector, post-wavelet transform, extracted in S906. A method for analysis of the periodicity and calculation of the autocorrelation function is described later. In addition, it is also possible for the configuration of the periodicity analysis unit 850 to take on a different configuration depending on the embodiment.

In S908, the process moves to S909 in the case where the periodicity analysis unit 850 has examined all the time series combinations of the parameter vector, post-wavelet transform, as calculated by the time series combination generation unit 830. The process moves to S906, and the processing from S906 to S908 repeats, in the case where the periodicity analysis unit 850 has not examined all the time series combinations of the parameter vector, post-wavelet transform.

In S909, the moving object detection unit 860 judges the presence or lack thereof of periodicity unique to a moving object from the periodicity analysis results for the time series combinations of post-wavelet transform parameter vector; the process moves to S910 in the case where there is periodicity unique to a moving object, and the process moves to S901 in the case where there is not periodicity unique to a moving object. Note that because the method for judging whether or not an object is a moving object is the same as in the first embodiment, descriptions are omitted.

Finally, in S910, the video display unit 870 displays the results based on the presence position and movement direction of the moving object as detected by the moving object detection unit 860.

Next, a processing of the image transformation unit 821 is described in detail.

Figure 10:
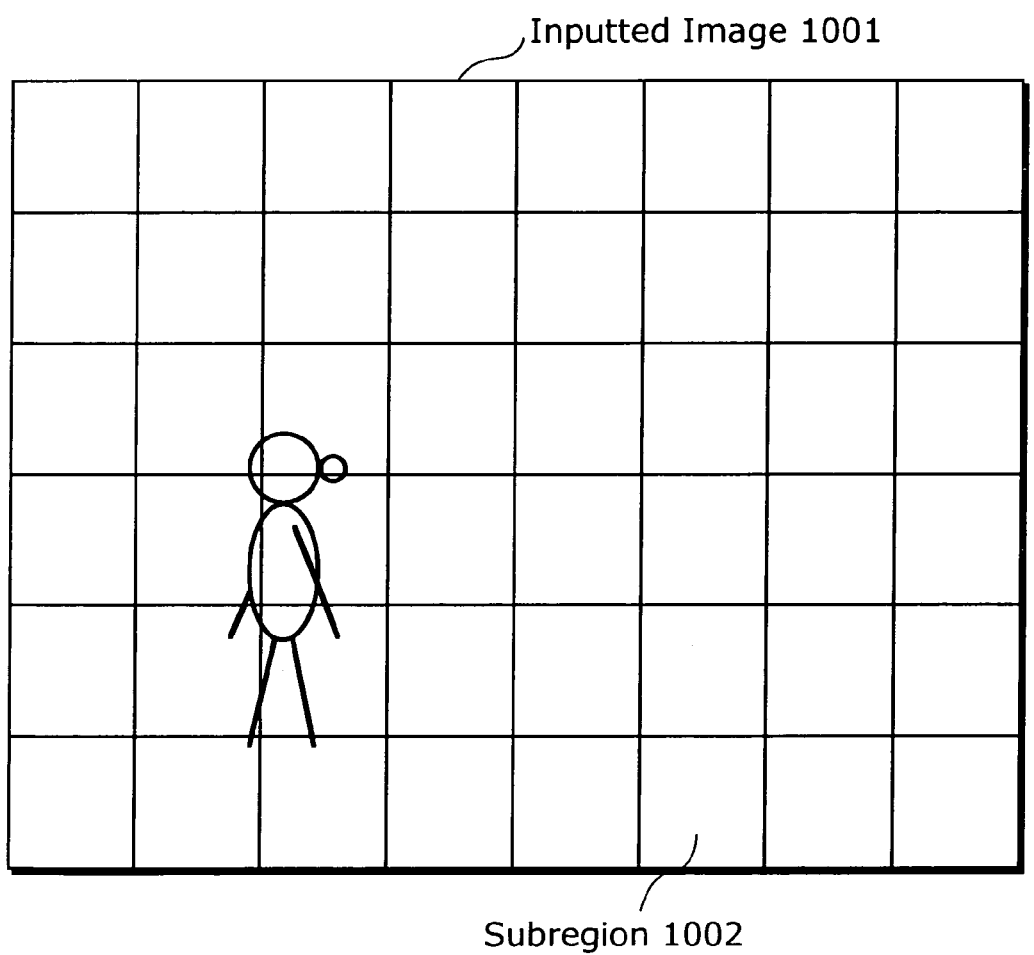
FIG. 10 is a diagram showing subregion divisions.
Figure 15:
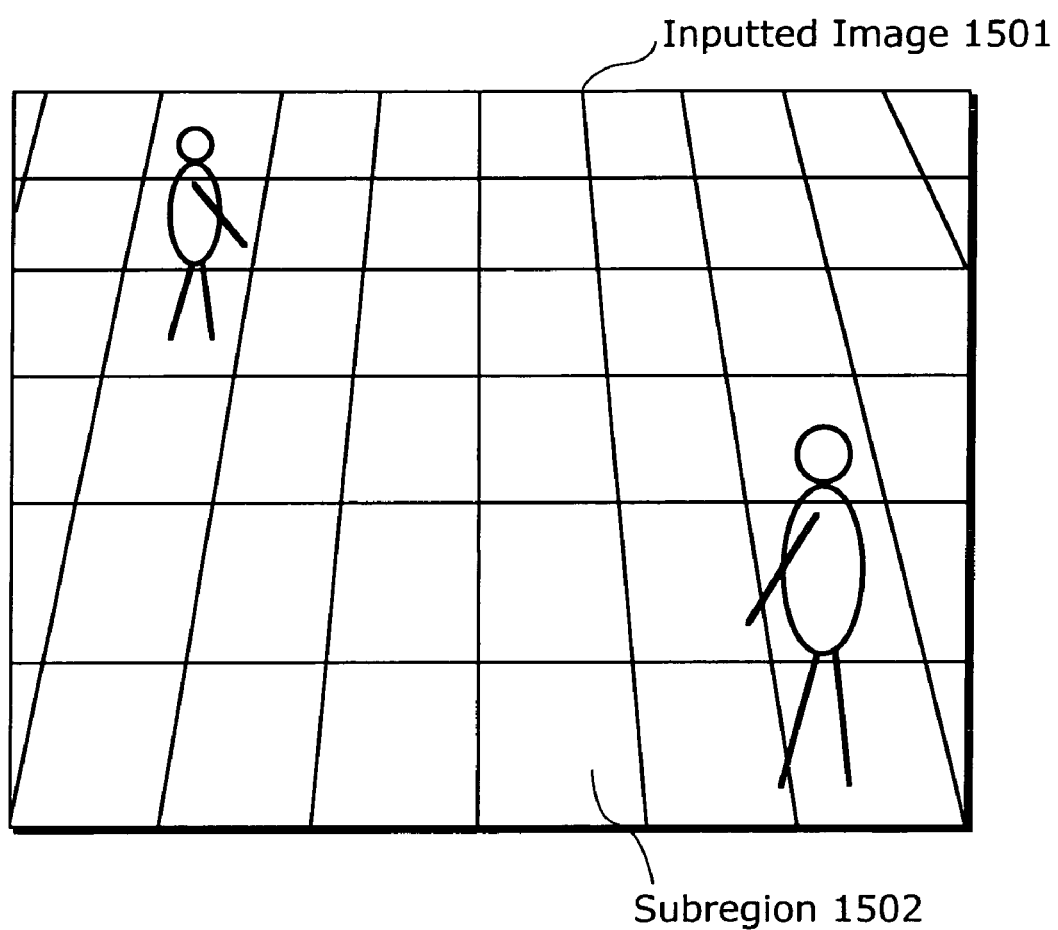
FIG. 15 is a diagram showing subregion divisions.

First, as shown in FIG. 10, the image transformation unit 821 divides an input image 1001, sent from the moving picture acquisition unit 810, into subregions 1002. In addition, in the case where the installation parameters of the camera are already known, by assuming that a floor is a plane, it is possible to calculate a size that the target object is filmed at depending on the location in the image. In general, the larger the distance between the target object and the camera becomes, the target object is filmed in the upper area of the screen, and therefore a target object that exists far away is filmed as a small object in the upper area of the image, as is shown in FIG. 15. Because of this, by dividing the image into subregions so that the subregions become smaller the higher they are in the image, it is possible to make the region in actual space occupied by one subregion uniform.

Then, the image transformation unit 821 carries out a two-dimensional Gabor wavelet transform per subregion 1002. Details regarding the Gabor wavelet transform can be found on pages 35 to 42 of Nakano, H., S. Yamamoto and Y. Yoshida, *Signal Processing and Image Processing by Wavelet*, Kyoritsu, 1999.

In the present embodiment, the two-dimensional Gabor wavelet transform is carried out using 16 types of Gabor wavelets, which are configured from 4 types of parameters equivalent to a frequency and a window width and 4 types of parameters equivalent to rotation, in central coordinates of each subregion 1002. In other words, a 16-dimensional parameter vector is outputted per subregion 1002. However, this does not limit the number of dimensions of the parameter vector, and it is possible to increase the number of parameters equivalent to rotation in order to express the degree to which the legs are open during movement more accurately. Because of this, it is also possible to denote the parameter vector as an M-dimensional parameter vector (M is a natural number).

Next, using FIG. 11, the time series combination generation unit 830 is described in further detail.

The time series combination generation unit 830 generates a time series combination of the parameter vector. In the present embodiment, the generation is carried out in the manner described hereafter, but this does not limit a method for combination, and it is also possible to reduce the combination number through threshold value processing and the like on the parameter vector. Note that in the case where another detection method is used in parallel, it is acceptable to determine the combination based on those detection results.

Figure 11A:
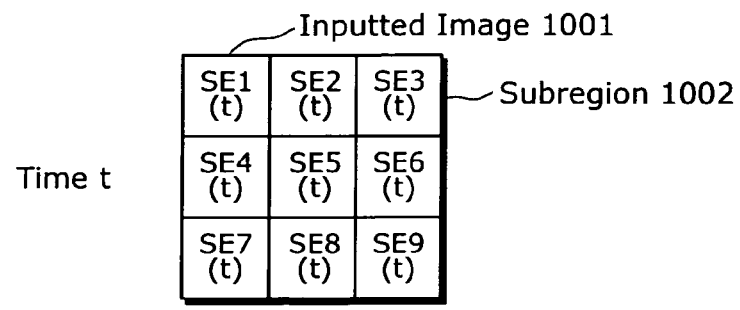
FIG. 11A is a diagram showing division of subregions.
Figure 11B:
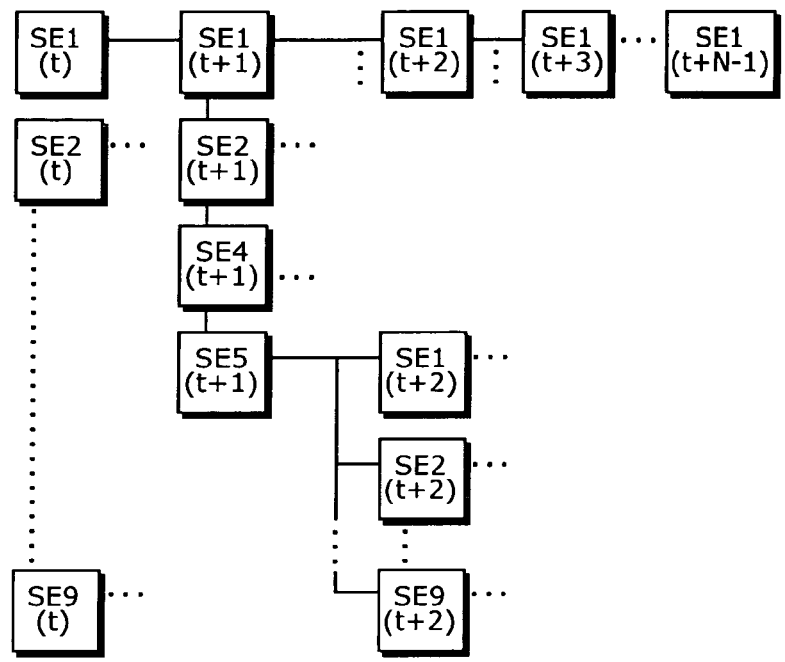
FIG. 11B is a diagram showing a time series combination of subregions.
Figure 11C:
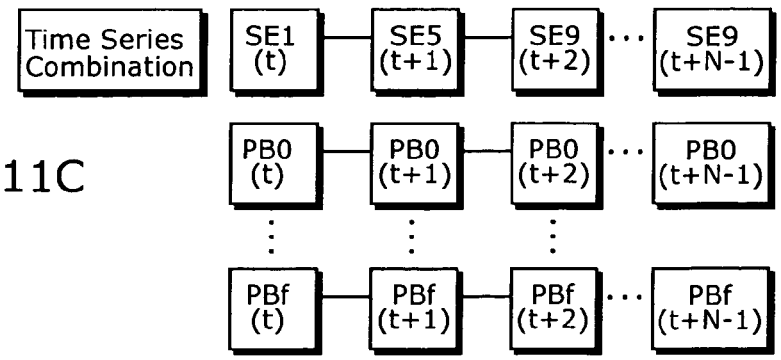
FIG. 11C is a diagram showing a time series combination of parameter vectors.

FIG. 11A shows the case where the inputted image 1001 in time t is divided into 9 subregions 1002. FIG. 11B shows a time series combination of the 9 subregions 1002. FIG. 11C shows a time series combination of the 16-dimensional parameter vector included in each subregion 1002. As shown in FIG. 11A, the time series combination of the subregions 1002 is a combination of peripheral subregions 1002, and because SE1 is the periphery of the inputted image 1001, a combination in time t+1 combines SE1, SE2, SE4, and SE5, as shown in FIG. 11B. In the same manner, SE3, SE7, and SE9 are the periphery of the inputted image 1001, and thus 4 subregions 1002 are applicable as combination candidates of time t+1, and while SE2, SE4, SE6, and SE8 are not shown in FIG. 11B, 6 subregions are combination candidates of time t+1. In contrast to this, as is shown in FIG. 11C, the time series combination of the 16-dimensional parameter vector is a combination of identical parameter vectors of differing subregions 1002. Therefore, a combination of parameter vector PB0, in which the time series of the subregion 1002 is SE1, SE5, SE9 . . . SE9, is PB0(t) of SE1(t), PB0(t+1) of SE2(t+1), PB0(t+2) of SE9(t+2) . . . PB0(t+N−1) of SE9(t+N−1); from PB1 to PBF, identical combinations and 16 N-dimensional parameter vectors are generated, and the 16 N-dimensional parameter vectors are sent to the inter-leg information extraction unit 840. Note that it is not necessary to divide the entire image into subregions; it is also acceptable to determine a moving object candidate region of a human and the like and divide on that candidate region into subregions, through pre-processing and so on. In such a case, it is possible to reduce the number of time series combinations of parameter vector.

The inter-leg information extraction unit 840 extracts inter-leg information from the 16 N-dimensional parameter vector, and the periodicity analysis unit 850 uses those results to carry out analysis of the periodicity. In other words, the N-dimensional parameter vector generated by the time series combination generation unit 830 are inputted to the inter-leg information extraction unit 840, and after calculation of the autocorrelation function using equation 2 in the same manner as in the first embodiment, the periodicity analysis unit 850 carried out analysis of the periodicity using $\tau_L$, which is the autocorrelation function $C(\tau)=0$, as the correlation length. Note that in the present embodiment, $\tau_L$, which is the autocorrelation function $C(\tau)=0$, is the correlation length. However, the correlation length does not necessarily have to be a position $\tau$ when the autocorrelation function $C(\tau)=0$; anything is acceptable as long as the periodic fluctuation of the movement can be ascertained.

The periodicity analysis unit 850 calculates the autocorrelation function on the time series data of the correlation length $\tau_L$ in the same manner as in the first embodiment, and therefore descriptions are omitted. Here, the autocorrelation function $Ct(\tau)$ of the correlation length, which is the result of calculation of the autocorrelation length on the time series data of the correlation length $\tau_L$, is outputted to the moving object detection unit 860. In addition, in the same manner, the periodicity analysis unit 850 outputs a signal for continuing calculation to the time series combination generation unit 830, until all calculations on the 16 N-dimensional parameter vector generated by the time series combination generation unit 830 have finished.

Next, the moving object detection unit 860 is described in further detail.

The moving object detection unit 860 includes: a peak extraction unit 861, which detects a peak position $\alpha_w$ from the autocorrelation function $Ct(\alpha)$ of the correlation length inputted from the periodicity analysis unit 850, and judges whether or not an object is a moving object by verifying whether or not the detected peak position $\alpha_w$ matches with the movement period of a moving object; a peak number accumulation unit 862, which carries out peak detection in the 16 N-dimensional parameter vector and accumulates the detected peak number; and a presence position isolation unit 863, which, in the case of judging that an object in an image frame is a moving object using the accumulated peak number, isolates and outputs, to the video display unit 870, the presence position and movement direction of the moving object. In the present embodiment, detection of a peak position $\tau_w$ is carried out with the same method as described in the first embodiment, and therefore descriptions are omitted.

The peak detection unit 861 adds 1 to the peak number accumulation unit 862 in the case where a peak unique to the movement of a moving object is detected from the calculation results of the autocorrelation function of the correlation length. At that time, combination information of the subregions, generated by the time series combination generation unit 830, is also stored at the same time. Note that the combination information of the subregion 1002 s information that expresses how the subregions which calculate the 16 N-dimensional parameter vector are combined, when the time series combination generation unit 830 generates a time-series vector of 16×N-dimensions. In other words, the combination information of the subregions is a vector of N dimensions, and each element is a number indicating a subregion.

In the present embodiment, a value stored in the peak number accumulation unit 862 uses the 16 N-dimensional parameter vector, and therefore is a peak number 16, in the case where a peak exists in all of the 16 N-dimensional parameter vector. Because of this, the peak number is accumulated with the 16 N-dimensional parameter vector, generated by the time series combination generation unit 830, as a single unit.

The peak number accumulation unit 862 sends the combination of subregions with the maximum accumulated peak number to the presence position isolation unit 863.

The presence position isolation unit 863 isolates and outputs, to the video display unit 870, a presence position 72 and a movement direction of the moving object. Note that the presence position 72 indicates the presence position in the image, and is the subregion 1002 in the inputted image 1001 of the newest frame, from the combination information of the subregions 1002 sent to the presence position isolation unit 863.

In addition, when the inputted image 1001 of the newest frame is N frame, the movement direction is a line joining central coordinates of a subregion 1002 in N−1 frame with central coordinates of a subregion 1002 in the newest frame. Through this, it is possible to display the presence position and movement direction in the image. In addition, by transforming the detected presence position to a position in world coordinates, it is possible to isolate the presence position in real space. Furthermore, using the detected movement direction, it is possible to predict the presence position in N+1 frame.

The video display unit 870 displays the presence position and movement direction of the moving object in accordance with the abovementioned information.

As described above, in the present embodiment, it is possible to carry out stable detection of a moving object without mistakenly identifying another moving object even in the case where initial detection cannot be carried out in an ideal manner, by carrying out moving object detection based on image processing such as a wavelet transform and periodicity analysis, using a plurality of images. In addition, it is possible to detect the movement direction at the same time as the presence position of the moving object.

Note that with the moving object detection device in the present embodiment, the image conversion unit 821 uses a wavelet transform, but it is also acceptable to use a Hough transform or a Fourier transform. It is possible to obtain the same results in such a case as well.

Third Embodiment

Next, a moving object detection device according to the third embodiment of the present invention is described.

In the present embodiment, a geometric figure is applied to an inputted image. Here, the case described is the case in which: a partial image resembling a geometrical figure equivalent to inter-leg information is extracted; the partial image is transformed into parameters, and those parameters arranged in time order and accumulated as time series parameters; and a moving object is detected by analyzing a periodicity from the time series parameters held by that inter-leg information. In addition, the case where a moving object is detected from a moving picture saved on a videotape and so on is described; however, as described in the first embodiment, the configuration in FIG. 1, including a camera 100 and the installation parameters, is also possible.

Figure 12:
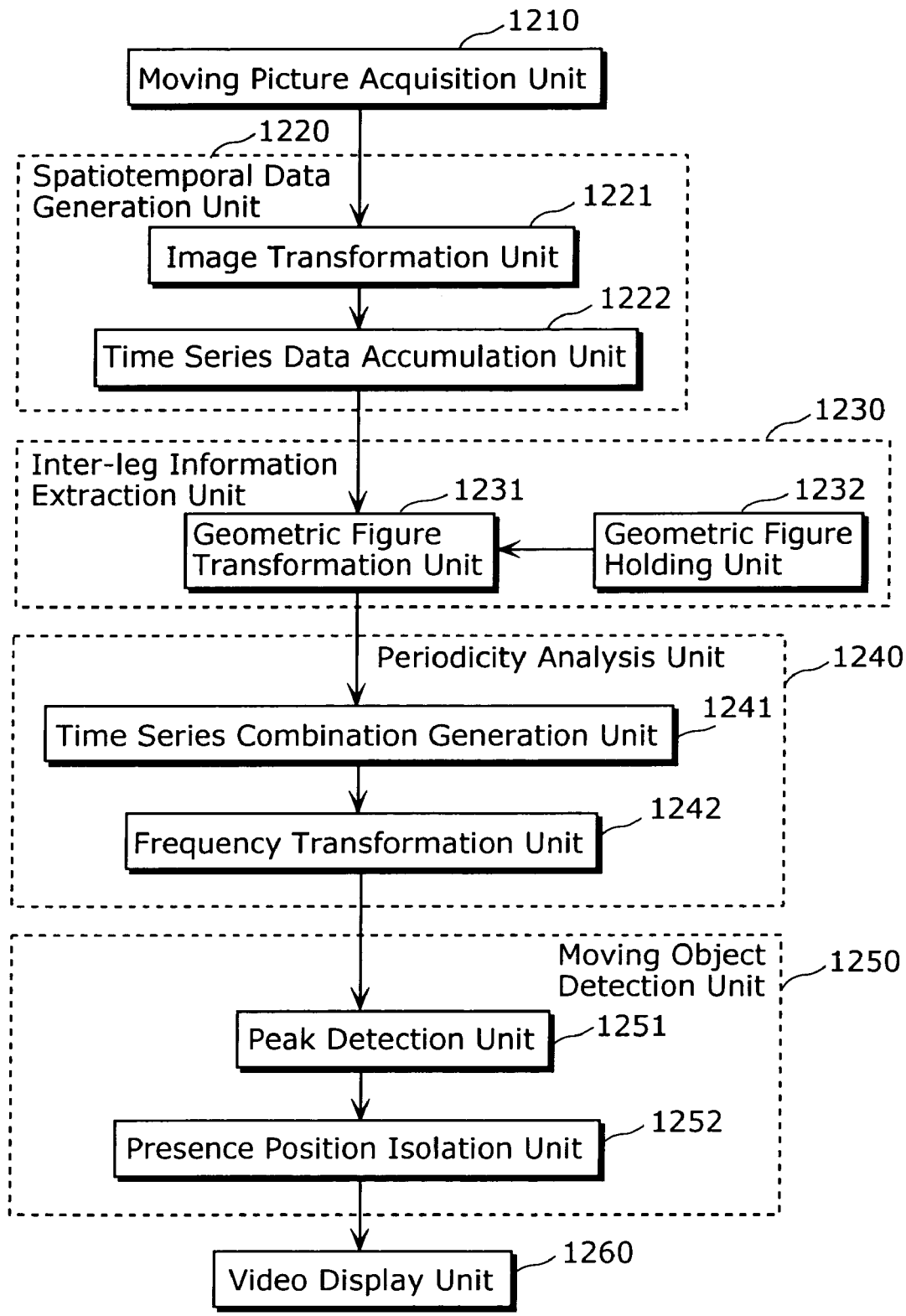
FIG. 12 is a diagram showing a configuration of a moving object detection device according to the third embodiment of the present invention.

FIG. 12 is a diagram showing a moving object detection device according to the present embodiment. This moving object detection device is, as in the first and second embodiments, a device that detects a moving object which exists in a video filmed in a shop, a parking lot, a city street, and so on, but has a characteristic of extracting a partial image resembling a geometrical figure by applying the geometrical figure to an inputted image, transforming the partial image into parameters, arranging those parameters in time order as time series parameters, and detection a moving object by analyzing a periodicity from those time series parameters. The moving object detection device includes: a moving picture acquisition unit 1210; a spatiotemporal data generation unit 1220; an inter-leg information extraction unit 1230; a periodicity analysis unit 1240; a moving object detection unit 1250; and a video display unit 1260.

Note that in the first embodiment, the time series data is accumulated as images, and the moving object is detected by analyzing the periodicity from those time series images; and in the second embodiment, images parameterized through an image transform are the time series data, and that periodicity is analyzed. However, in the present embodiment, a predetermined periodicity included in an image is emphasized, and as shown in FIG. 12, an image applied with a geometric figure and parameterized by a geometric figure transformation unit 1231 is time series data, and periodicity of that time series data is analyzed. Through this, periodicity analysis becomes simpler. In the present embodiment, the case explained is the case where a group of two straight lines is used a model of legs in the geometric figure application for acquiring the inter-leg information.

The moving picture acquisition unit 1210 is a signal interface or the like which acquires a video, recorded on a video tape and so on, as a moving picture on a per-frame basis. The acquired image is sent on a per-frame basis to the spatiotemporal data generation unit 1220. However, the video does not need to be on a per-frame basis, but may be any image that can be acquired arranged in time series. In addition, in the case where moving picture data is used, the data may be saved on magnetic tape, in a hard disk, and in RAM, and may be saved in a data holding unit within a network.

The spatiotemporal data generation unit 1220 includes, as shown in FIG. 12, an image transformation unit 1221 and a time series data accumulation unit 1222. The image transformation unit 1221 carries out interframe differential processing or background differential processing on the inputted video, converts the image to a binarized image based on a threshold value, and extracts a silhouette image. The time series data accumulation unit 1222 is a processing unit and storage device that generates spatiotemporal data using parameters of a predetermined time N amount.

The inter-leg information extraction unit 1230 includes: a geometric figure transformation unit 1231, which applies a geometric figure to the inputted time series data; and a geometric figure holding unit 1232, which holds the geometric figure applied by the geometric figure transformation unit. The geometric figure transformation unit 1231 is a processing unit that emphasizes a predetermined periodicity included in an image, and by applying a geometrical figure such as a straight line, an oval, and a rectangle on the silhouette image, transforms the silhouette image into parameters expressing an angle and a distance of the inter-leg area. The geometric figure holding unit 1232 is a memory and the like which holds the geometric figure for carrying out application in the geometric figure transformation unit 1231.

Note that in the present embodiment, the case described is the case in which the group of two straight lines representing legs is applied to the silhouette image generated by the image conversion unit 1221, and the inter-leg angle held by the applied group of straight lines is transformed, generating time series data. Note that in the application of the geometrical figure, an oval and a rectangle are also acceptable. In addition, a figure having a three-dimensional volume, such as a cylinder, is also acceptable.

The periodicity analysis unit 1240 is a processing unit that carries out periodicity analysis on the spatiotemporal data that holds the inter-leg information extracted by the inter-leg information extraction unit 1230, in order to detect a periodicity particularly unique to the movement of the moving object, and detects a periodicity unique to a moving object. A time series combination generation unit 1241 is a processing unit that generates N-dimensional inter-leg angle time series data (N-dimensional time series parameter vector) by combining, in time series, the results of the geometrical figure application carried out by the inter-leg information extraction unit 1230. A frequency transformation unit 1242 is a processing unit which carries out a Fourier transform on the N-dimensional time series parameter vector generated by the time series combination generation unit 1241, and outputs, to the moving object detection unit 1250, a vector that has a resilience for each frequency.

The moving object detection unit 1250 is a processing unit that is inputted with periodicity data calculated by the periodicity analysis unit 1240, and from that periodicity data, judges whether or not an object is a moving object, and includes a peak detection unit 1251 and a presence position isolation unit 1252. The peak detection unit 1251 is a processing unit that detects a peak in a frequency matching the movement cycle of a moving object, in the time series parameter vector having a resilience post-Fourier transform, for each frequency inputted from the periodicity analysis unit 1240. The presence position isolation unit 1252 is a processing unit which judges a moving object when a peak is detected, and isolates and outputs, to the video display unit 1260, a presence position and movement direction of the moving object. The video display unit 1260 is an LCD and the like which shows the moving object detection results, and displays the presence position and movement direction of the moving object in a downward-view diagram.

Figure 13:
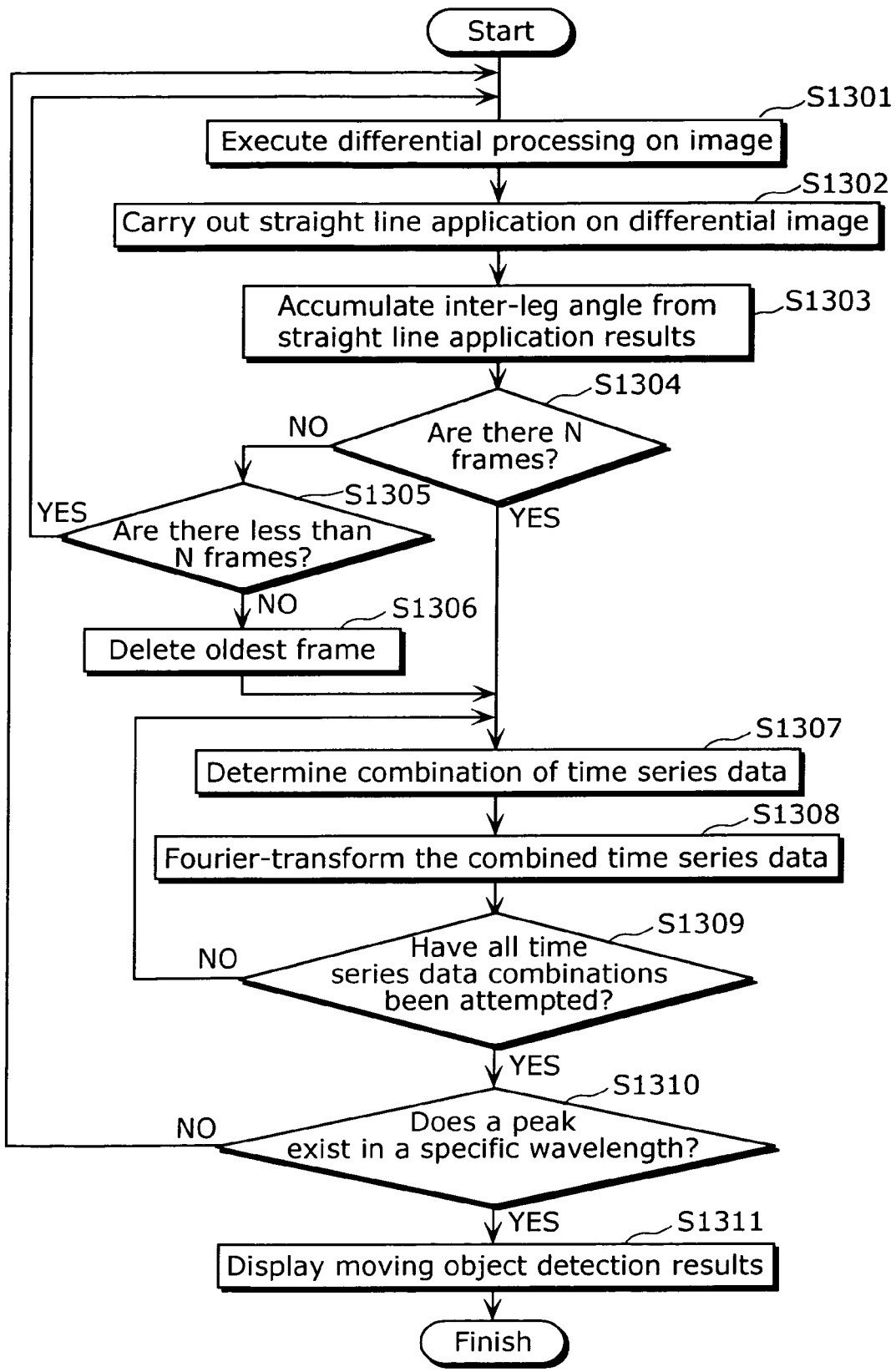
FIG. 13 is a flowchart showing an operation of the moving object detection device.

Next, the flowchart in FIG. 13 is used to describe, in detail, an operation of the moving object detection device according to the present embodiment and configured in the abovementioned manner.

First, in S1301, the image transformation unit 1221 carries out interframe differential processing or background differential processing per-frame of the inputted image, on the moving picture acquired from the moving picture acquisition unit 1210, and extracts a silhouette image by transforming the image into a binary image based on a threshold value. At this time, it is also acceptable to carry out outline extraction and noise removal and extract the silhouette image. Note that in the case where background differential processing in carried out, a background image in which a moving object does not exist is prepared in advance.

In S1302, the time series data accumulation unit 1222 accumulates the silhouette image obtained in S1301 as spatiotemporal data in a buffer in time order. Note that the spatiotemporal data generation unit 1220 can obtain the same effect even when its configuration differs depending on the embodiment.

In S1303, the geometric figure transformation unit 1231 applies a geometric figure to the silhouette image. In the present embodiment, a straight line group is described as an example of the applied geometric figure. The applied straight line group holds the inter-leg angle, which is the angle of the straight line intersection, as a group of two straight lines and those parameters in the geometric figure holding unit 1232. As a result of the application, that inter-leg angle and the presence position in the image are outputted to the time series combination generation unit 1241. In the present embodiment, the case described is the case where a group of 2 straight lines is applied, but applying another figure is also acceptable. The geometric figure transformation unit and the geometric figure holding unit are described later.

In S1304, the time series data accumulation unit 1222 generates spatiotemporal data using the inter-leg angle time series data of a pre-determined time N amount; in the case where there are N frames of the spatiotemporal data, the process moves to S1307, and in the case where there are not N frames, the process moves to S1305.

In S1305, in the case where there are less than N frames in the spatiotemporal data, the process moves to S1301, and in the case where there are more than N frames in the spatiotemporal data, the process moves to S1306.

In S1306, in the case where data generated from the N+1th image is sent from the image transformation unit 1221, the time series data accumulation unit 1222 generates spatiotemporal data which holds time series data of N time amount by canceling data of the first image frame from the spatiotemporal data.

Note that a method for generating the spatiotemporal data is described later. Here, it is not necessary to input and cancel one frame at a time; any means is acceptable as long as data of time N amount, arranged in time order, can be acquired. In addition, in the case where moving picture data is used, the data may be saved on magnetic tape, in a hard disk, and in RAM, and may be saved in a data holding unit within a network. Here, the video does not necessarily have to be per-frame; it may be data sampled over a set time.

In S1307, the time series combination generation unit 1241 is a processing unit which generates N-dimensional inter-leg angle time series data by combining, in time series, the geometric figure application results from the inter-leg angle time series data of N time amount as generated by the inter-leg information extraction unit 1230. Note that the time series combination generation unit is described later.

In S1308, the frequency transformation unit 1242 carries out a Fourier transform on the geometric parameter vector, which is time series combination data of the geometric figure application results extracted in S1307, in order to carry out analysis of the periodicity. A method for analyzing the periodicity and the Fourier transform are described later. In addition, the periodicity analysis unit 1240 can obtain the same effect even when its configuration differs depending on the embodiment.

In S1309, the process moves to S1307, and the parameter vector is determined based on a new time series combination, in the case where the frequency transformation unit 1242 has not finished periodicity analysis for all time series combinations that are results of the geometric figure application carried out by the time series combination generation unit 1241, and the process moves to S1310 in the case where the frequency transformation unit 1242 has finished periodicity analysis for the parameter vector of all combinations.

In S1310, the moving object detection unit 1250 judges whether an object is a moving object or not by judging the presence or lack thereof of periodicity unique to a moving object, from the periodicity analysis results for the time series combination of a geometric parameter vector calculated by the periodicity analysis unit 1240, and determines the presence position and movement direction of the moving object. A method for judging whether an object is a moving object or not is described later.

Finally, in S1311, results based on the presence position and movement direction of the moving object as detected by the moving object detection unit 1250 are displayed in the video display unit 1260.

Next, the inter-leg information extraction unit 1230 is described in further detail.

Figure 14A:
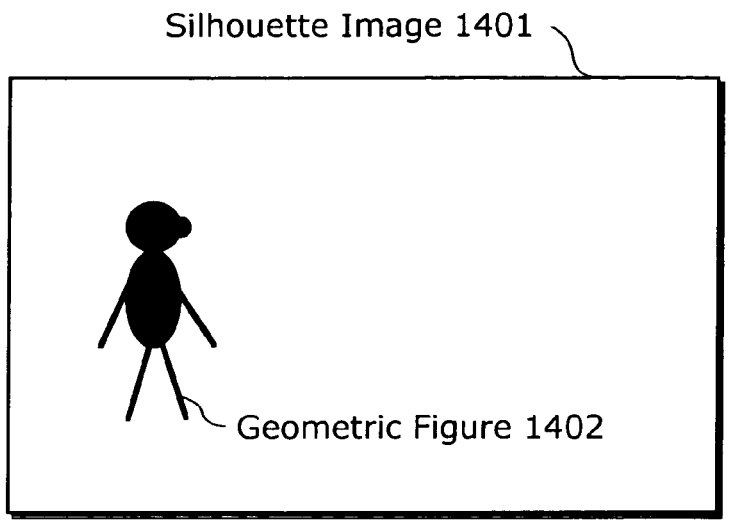
FIG. 14A is a diagram showing extraction of a geometric shape.
Figure 14B:
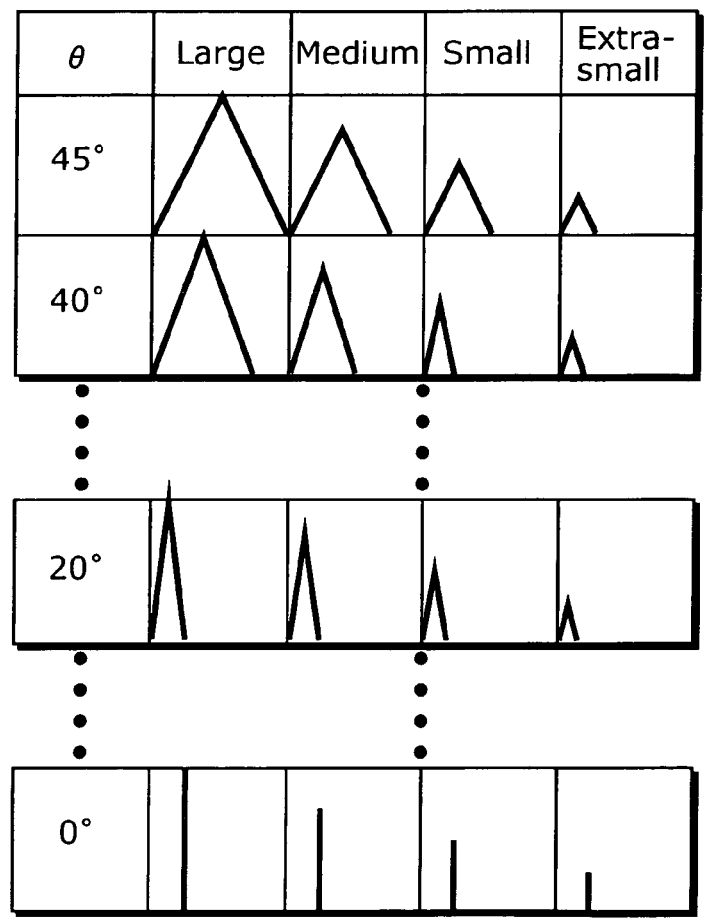
FIG. 14B is a diagram showing data held by the geometric shape.

The geometric figure transformation unit 1231 carries out application of a geometric FIG. 1402, which is group of two straight lines used to model legs, on a silhouette image 1401 accumulated by the time series data accumulation unit 1222, as shown in FIG. 14A. As shown in FIG. 14B, the geometric figure holding unit 1232 holds straight line groups that correspond to a plurality of sizes and a plurality of inter-leg angles, and holds the inter-leg angles as parameters. Note that an inter-leg area, rather than an inter-leg angle, may be held as data.

These straight line groups are applied to the silhouette image 1401, and a coordinate position in the applied image and that inter-leg angle is sent to the time series combination generation unit 1241 when about a pre-determined threshold value. Note that application of the straight line group to the silhouette image 1401 is carried out through pattern matching, but it is also acceptable to express the straight line group with a generalized Hough transform, and carry out application.

Next, the periodicity analysis unit 1240 is described in further detail.

The time series combination generation unit 1241 generates a time series combination of the applied inter-leg angles. In the present embodiment, this generation is carried out as follows, but the following does not limit the method for generating a time series combination of the inter-leg angles. Note that in the case where another detection method is used in parallel, it is acceptable to determine the time series combination of the inter-leg angles based on those detection results.

The time series combination generation unit 1241 generates, based on (xt, yt), which is a an application position of a straight line group in time t, a combination (xt+1, yt+1), which is an application position of a straight line group existing in a region in the vicinity of (xt, yt) in the image region in time t+1. The time series combination is generated by carrying out all such combinations of application positions existing in a region in the vicinity. Here, the applied straight line group holds the inter-leg angle and size as parameters, and through the time series combination, time series parameters are obtained which have an inter-leg angle of N dimensions arranged in time order. Note that the definition of regions in the vicinity is set in accordance with the image size and image frame rate. The generated N-dimensional time series parameter is sent to the frequency transformation unit 1242.

The frequency transformation unit 1242 carries out a Fourier transform on the N-dimensional time series parameter vector generated by the time series combination generation unit 1241. After the Fourier transform has been carried out, a vector that has resilience in each frequency is obtained, and that vector is outputted to the moving object detection unit 1250. Also, at the same time, the frequency transformation unit 1242 outputs, to the time series combination generation unit 1242, a signal for continuing calculations, until all calculations of the time series parameter vector generated by the time series combination generation unit 1241 have finished. Hereafter, the same processing is carried out until all calculations of the time series parameter vector generated by the time series combination generation unit 1241 finish.

Next, the moving object detection unit 1250 is described in further detail.

The moving object detection unit 1250 includes: a peak detection unit 1251, which detects a peak in a frequency that matches the movement cycle of a moving object, in the post-Fourier transform time series parameter vector which has a resilience in each frequency, as inputted from the frequency transformation unit; and a presence position isolation unit 1252, which judges that an object is a moving object when a peak is detected, and isolates and outputs, to the video display unit 1260, the presence position and movement direction of the moving object.

The peak detection unit 1251 carries out peak detection only on an element that expresses a frequency equivalent to the movement cycle of a moving object, from among the inputted time series parameter vector. In other words, in the case where a peak exists in the same frequency as the movement cycle, the object is judged to be a moving object; in other cases, the object is judged not to be a moving object. In the case where a peak unique to the movement of a moving object is detected, the peak detection unit 1251 sends a peak detection signal and (xt+N, yt+N) from the applied position combination (xt, yt) which the time series parameters generated. In this manner, geometric figures are applied in each time and parameterization is carried out, and by judging the periodicity of those time series parameters, robust moving object detection is possible even in the case where geometric figure application has temporarily failed.

The presence position isolation unit 1252 isolates and outputs, to the video display unit 1260, the presence position and movement direction of the moving object. The presence position indicates the presence position in the image, and using information sent from the peak detection unit 1251, (xt+N, yt+N) corresponding to the newest frame is the presence position of the moving object. In addition, regarding the movement direction, when the newest frame is N frame, a line connecting (xt+N−1, yt+N−1) in N−1 frame with (xt+N, yt+N) in the newest frame is the movement direction.

Through this, it is possible to display the presence position and movement direction in the image. In addition, by transforming the presence position to a position in world coordinates, it is possible to specify the presence position in real space. Furthermore, using the detected movement direction, it is possible to predict the presence position in N+1 frame.

The video display unit 1260 displays the presence position and movement direction of the moving object in accordance with the above information.

As described above, according to the present embodiment, a moving object is detected by applying a geometric figure, which indicates inter-leg fluctuation, to an inputted image and analyzing the periodicity of the time series parameters that indicate the state of the application. Therefore, a moving object that has two or more legs can be accurately detected, and the moving object can be detected in a stable manner without being influenced by the environment of reference conditions, the initial detection accuracy, and so on. In addition, it is possible to detect the movement direction of the moving object at the same time as the presence position.

Fourth Embodiment

Next, a moving object detection device according to the fourth embodiment of the present invention is described.

Figure 16:
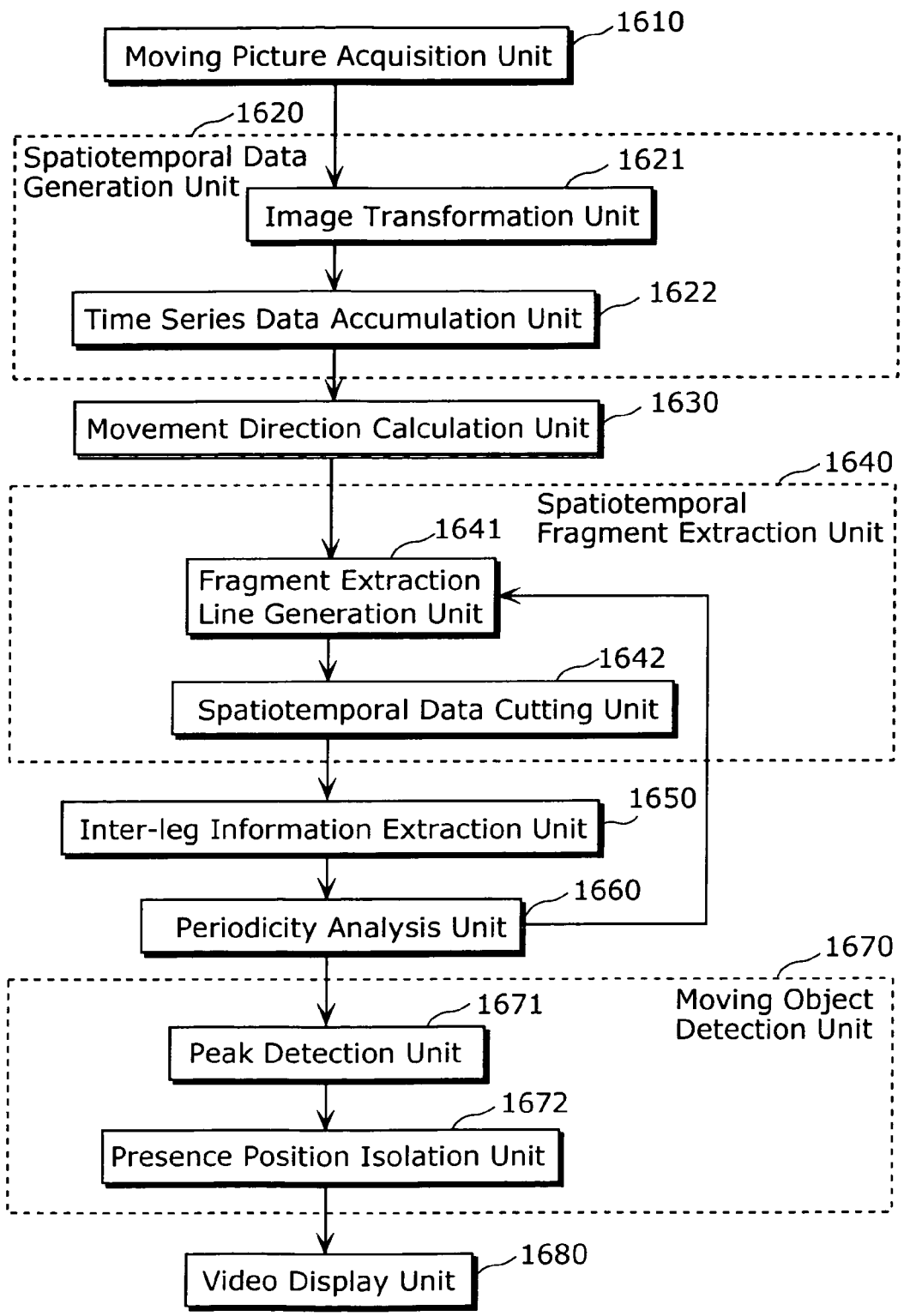
FIG. 16 is a diagram showing a configuration of a moving object detection device according to the fourth embodiment of the present invention.

FIG. 16 is a diagram showing a configuration of the moving object detection device according to the present embodiment. This moving object detection device is, as in the first embodiment and so on, a device that detects a moving object which exists in a video filmed in a shop, a parking lot, a city street, and so on, but has a characteristic of analyzing a periodicity of a moving object faster and more accurately by calculating a movement direction of the moving object. The moving object detection device includes: a moving picture acquisition unit 1610; a spatiotemporal data generation unit 1620; a movement direction calculation unit 1630; a spatiotemporal fragment extraction unit 1640; an inter-leg information extraction unit 1650; a periodicity analysis unit 1660; a moving object detection unit 1670; and a video display unit 1680.

The moving picture acquisition unit 1610 is a signal interface or the like which acquires a video, recorded on a video tape and so on, as a moving picture on a per-frame basis. The acquired image is sent on a per-frame basis to the spatiotemporal data generation unit 1620. In addition, in the case where moving picture data is used, the data may be saved on magnetic tape, in a hard disk, and in RAM, and may be saved in a data holding unit within a network. Here, the video does not necessarily have to be per-frame. It may be any data in which images can be acquired arranged in time order; for example, data sampled over a set time. Of course, the moving picture acquisition unit 1610 may take on a configuration including a camera and installation parameters thereof, as described in the first embodiment.

The spatiotemporal data generation unit is a processing unit and storage device which, as a unit that emphasizes a predetermined periodicity within an image, carries out interframe differential processing per-frame on an inputted video, or differential processing on images arranged in time order, or background differential processing, and transforms the image into a binarized image based on a threshold value; and generates spatiotemporal data using images of a pre-determined time N amount by accumulating the post-transformation images in frame time order. Note that in the present embodiment, the images are arranged in time order of the frames, so a three-dimensional spatiotemporal image is generated.

The movement direction calculation unit 1630 is a processing unit that calculates the direction in which the moving object is moving in the image, for time series data accumulated by the spatiotemporal data generation unit 1620.

The spatiotemporal fragment extraction unit 1640 extracts a spatiotemporal fragment by cutting the accumulated spatiotemporal data parallel to a temporal axis.

The inter-leg information extraction unit 1650 extracts inter-leg information generated by two or more legs in each time from the spatiotemporal fragment extracted by the spatiotemporal fragment extraction unit 1640.

The periodicity analysis unit 1660 is a processing unit that carries out periodicity analysis on the spatiotemporal data generated by the spatiotemporal data generation unit 820, in order to detect a periodicity appearing particularly in movement of the moving object, and detects a periodicity unique to a moving object that has legs using movement direction information detected by the movement direction calculation unit 1630.

The moving object detection unit 1670 is a processing unit which is inputted with periodicity data calculated by the periodicity analysis unit 1660, and from that periodicity data, judges whether or not an object is a moving object.

The video display unit 1680 is an LCD and the like which shows the moving object detection results, and displays the presence position and movement direction of the moving object in a downward-view diagram.

Here, the spatiotemporal data generation unit 1620 further includes an image transformation unit 1621 and a time series data accumulation unit 1622. The image transformation unit 1621 is a processing unit which carries out interframe differential processing per frame, or background differential processing, and binarizes the video based on a threshold value. The time series data accumulation unit 1622 is a memory and the like that accumulates the binarized images as a buffer in time order, in order to generate the spatiotemporal data.

In addition, the spatiotemporal fragment extraction unit 1640 is a processing unit which determines parameters of a fragment extraction line in accordance with the movement direction calculated by the movement direction calculation unit 1630, and extracts, from the spatiotemporal data generated by the spatiotemporal data generation unit 1620, a spatiotemporal fragment using the determined fragment extraction line. The spatiotemporal fragment extraction unit 1640 further includes: a fragment extraction line generation unit 1641, which determines the fragment extraction line that cuts the spatiotemporal data in the world coordinate system, which is a coordinate axis that expresses real space, in order to detect a presence position and the movement direction of the moving object; and a spatiotemporal data cutting unit 1642, which carries out extraction of the spatiotemporal fragment from the spatiotemporal data.

Note that the inter-leg information extraction unit 1650 is aimed at extracting relative inter-leg space, not position information of the legs, in the extracted spatiotemporal fragment, and calculates an autocorrelation function every t time, and calculates respective correlation lengths. The periodicity analysis unit 1660 re-calculates an autocorrelation function on the time series of the correlation length, in which each calculated correlation length is arranged in time direction.

In addition, the moving object detection unit 1670 includes: a peak detection unit 1671, which detects a peak position from the autocorrelation function of the correlation length inputted from the periodicity analysis unit 1660, and judges whether an object is a moving object or not by verifying whether or not the detected peak position matches a movement period of the moving object; and a presence position isolation unit 1672, which isolates and outputs, to the video display unit 1680, the presence position and movement direction of the moving object.

Figure 17:
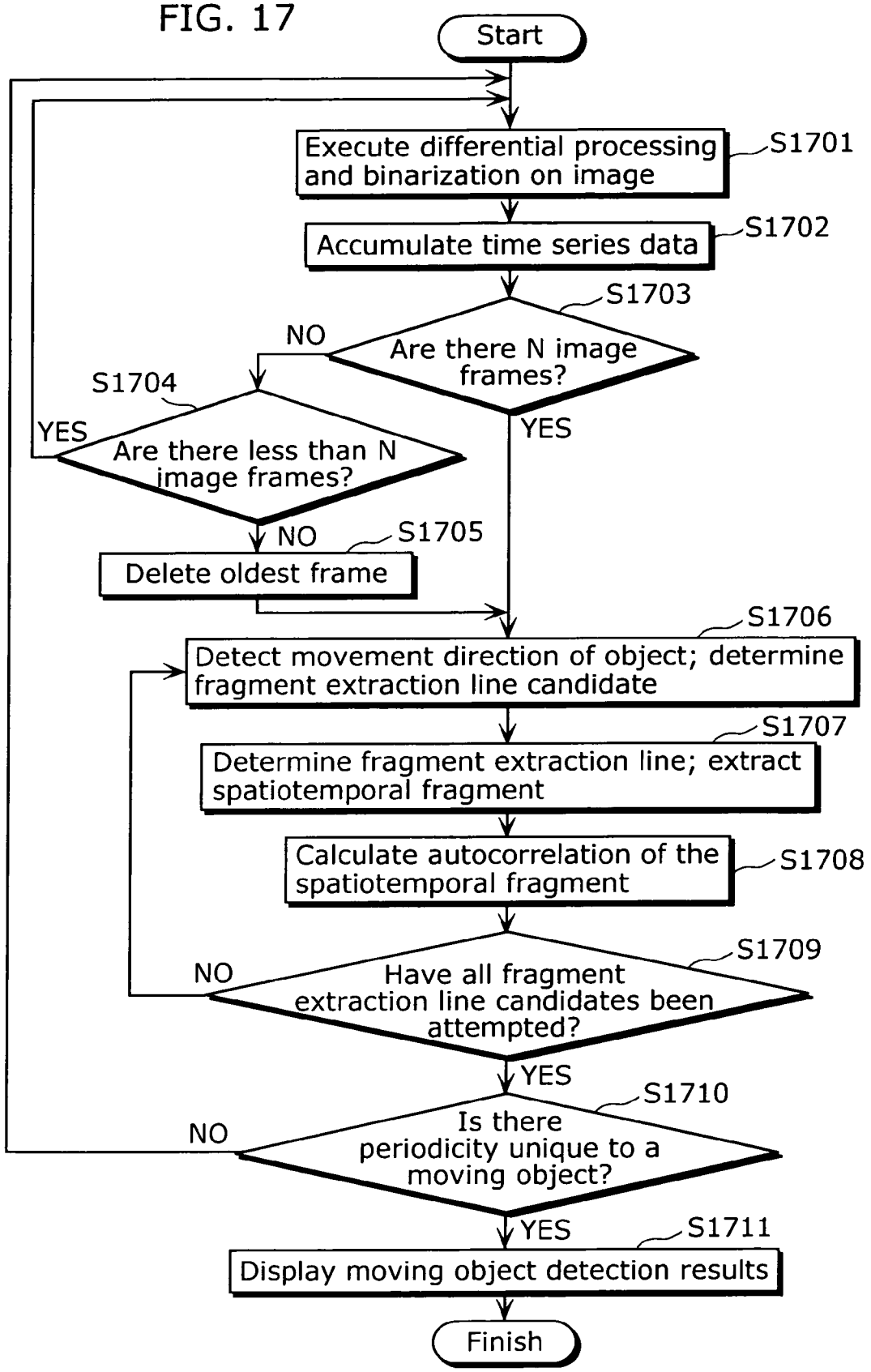
FIG. 17 is a flowchart showing an operation of the moving object detection device.

Next, the flowchart in FIG. 17 is used to describe, in detail, an operation of the moving object detection device according to the present embodiment and configured in the abovementioned manner.

First, in S1701, the image transformation unit 1621 carries out inter-frame differential processing per frame, or background differential processing, on a video acquired through the moving picture acquisition unit 1610, and binarizes the video based on a threshold value. Note that in the case where background differential processing in carried out, a background image in which a moving object does not exist is prepared in advance.

In S1702, the time series data accumulation unit 1622 accumulates the binarized images as a buffer in time order, in order to generate the spatiotemporal data. In addition, it is also possible for the configuration of the spatiotemporal data generation unit 1620 to take on a different configuration depending on the embodiment.

In S1703, the time series data accumulation unit 1622 generates the spatiotemporal data using the images or parameters, and the process moves to S1706 in the case where image frames of time N amount (N being a natural number) have been accumulated, whereas the process moves to S1704 in the case where image frames of time N amount have not been accumulated.

In S1704, the process moves to S1701 in the case where the image frames are less than the time N amount, and moves to S1705 in the case where the image frames exceed the time N amount.

In S1705, in the case where an N+1 th image is sent from the image transformation unit 1621, the time series data accumulation unit 1622 generates spatiotemporal data which always holds N frame amount of images, by canceling a first image frame from the spatiotemporal data. Here, it is not necessary to input and cancel one frame at a time; any means is acceptable as long as data of time N amount, arranged in time order, can be acquired. In addition, in the case where moving picture data is used, the data may be saved on magnetic tape, in a hard disk, and in RAM, and may be saved in a data holding unit within a network. Here, the video does not necessarily have to be per-frame; it may be data sampled over a set time.

In S1706 the movement direction calculation unit 1630 detects the movement direction of the object, and generates a slope candidate for the fragment extraction line. In addition, it is also acceptable to divide the spatiotemporal data into subregions and calculate the movement direction per divided region. A method for calculating the movement direction is described later.

In S1707, the spatiotemporal fragment extraction unit 1640 determines parameters of the fragment extraction line, and extracts the spatiotemporal fragment from the spatiotemporal data generated by the spatiotemporal data generation unit 1620, using the fragment extraction line based on the slope candidate of the fragment cutting line determined by the movement direction calculation unit 1630.

In S1708, the inter-leg information extraction unit 1650 carries out calculation of an autocorrelation function in order to carry out periodicity analysis on the spatiotemporal fragment extracted in S1707.

In S1709, in the case where the periodicity analysis unit 1660 has examined all fragment extraction line candidates, the process moves to S17170; and in the case where all fragment extraction line candidates have not been examined, the process moves to S1706, and the processing from S1706 to S1709 is repeated.

In S1710, the moving object detection unit 1670 judges the presence of lack thereof of periodicity unique to a moving object based on the periodicity analysis results from the spatiotemporal fragment as calculated by the periodicity analysis unit 1660; the process moves to S1711 in the case where there is periodicity unique to a moving object, and the process moves to S1701 in the case where there is not periodicity unique to a moving object.

Finally, in S1711, the video display unit displays results based on the presence position and movement direction of the moving object as detected by the moving object detection unit 1670.

Next, the movement direction calculation unit 1630 is described in further detail.

For methods of calculating the movement direction in the movement direction calculation unit 1630, there is a method which detects a target object candidate and calculates the movement direction, and a method which calculates the movement direction without detecting the target object. First, the method in which the target object candidate is detected, and the movement direction is calculated, is described.

Figure 18A:
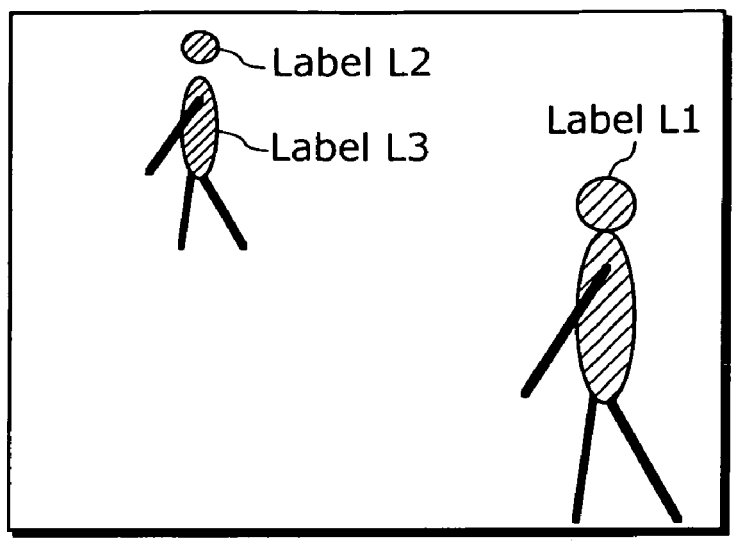
FIG. 18A is a diagram showing object extraction through labeling.

As shown in FIG. 18A, an isolated object can be captured as a detection target object candidate using a labeling algorithm which extracts an isolated object from one differential image. Object detection through a labeling algorithm is carried out by linking pixels with a value of 1 and assigning different labels to different linked areas. In the present embodiment, this is carried out as follows.

First, a pixel P which has a value of 1 and does not have a label assigned is extracted from a binarized differential image in time t, and assigned a label L. The same label L is assigned to all pixels linked to the pixel P. Object detection is carried out by continuing this process until there are no pixels that do not have labels assigned. Of course, another labeling method may be used as long as it can detect and isolated object. However, in this case, as this method does not use shape information concerning the object to be detected, there are situations in which two objects are detected as one, and one object is detected as divided into two, depending on the shape. In such a case as well, it is possible to reduce mistaken detection even when the labeling is not accurate, through periodicity judgment, described later.

Figure 18B:
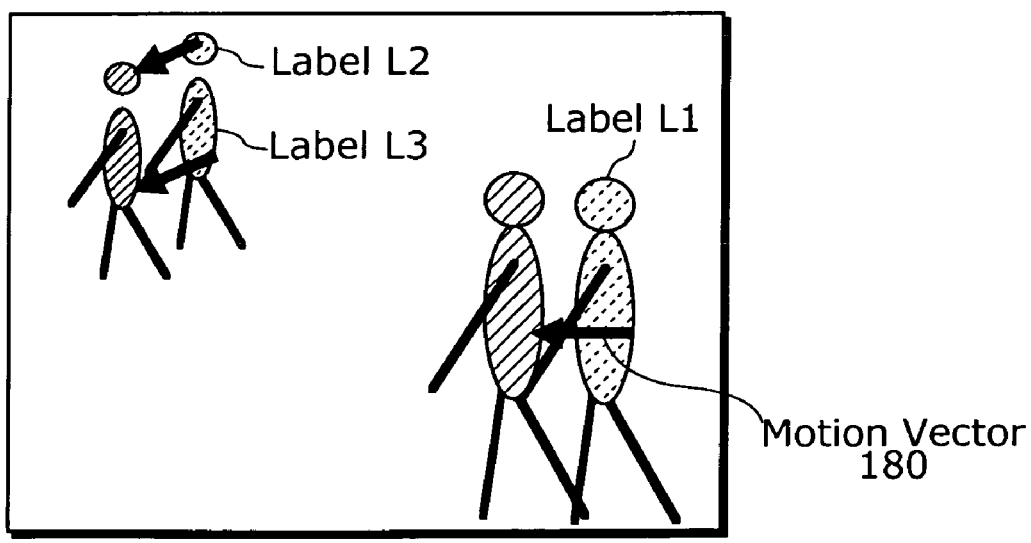
FIG. 18B is a diagram showing movement direction calculation.

Next, the motion vector up to the position with the maximum matching value is calculated by executing matching while disturbing a labeled moving object candidate in the image in time t, on the binarized differential image in time t+1 shown in FIG. 18B. This motion vector calculation processing is carried out over a set time, and the movement direction of the target object candidate is calculated by finding the average motion vector per label.

Figure 19A:
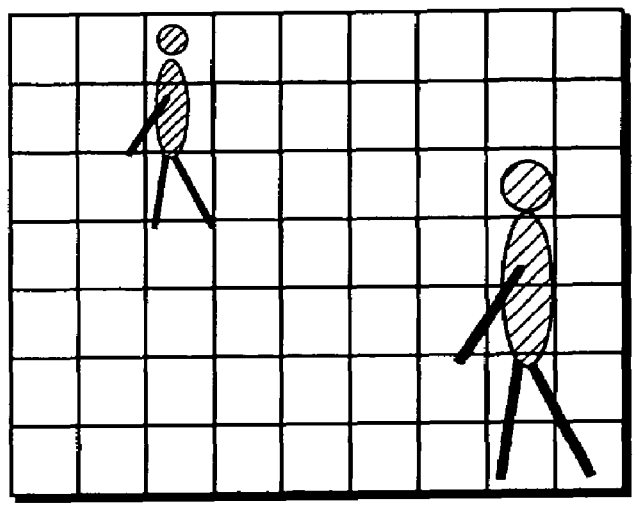
FIG. 19A is a diagram showing subregion divisions.

Next, the method in which the movement direction is calculated without detecting the target object is described. Here, a method which divides the image into subregions and calculates the movement direction is described, as shown in FIG. 19A. Note that it is acceptable to divide into subregions considering the camera parameters, as shown in FIG. 15.

Figure 19B:
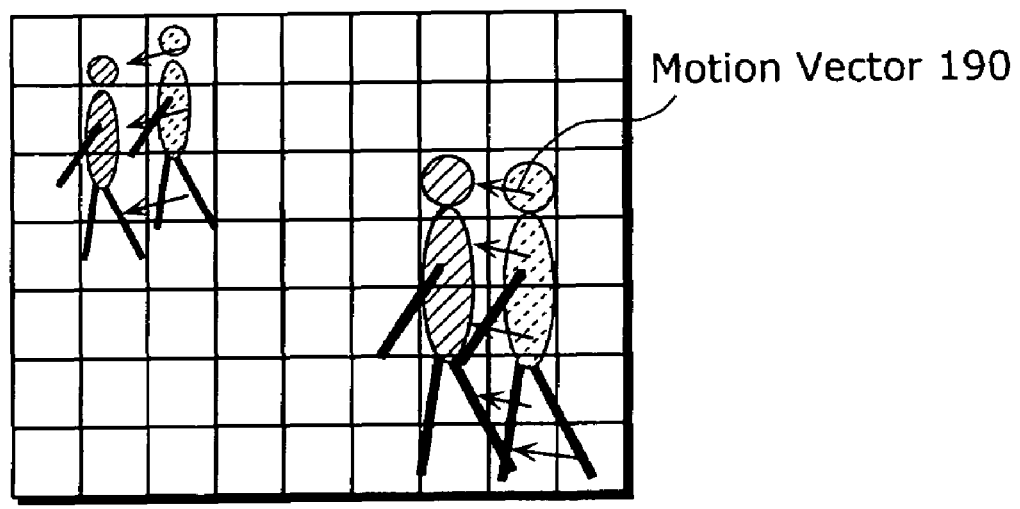
FIG. 19B is a diagram showing movement direction calculation.

First, in the case where an amount of pixel value 1 pixels equal to or exceeding a certain set number exists in each subregion in a binarized differential image in time t, matching between that image and a binarized differential image in time t+1 is carried out by disturbing that subregion. At this time, the motion vector up to the position with the maximum matching value is calculated as a result of disturbing the subregion from its current position. Through this, a motion vector is calculated in each subregion, as shown in FIG. 19B. This motion vector calculation processing is executed over a set time, and finds the average motion vector in each subregion. Then, the average motion vector calculated in each subregion is voted on, and in the case where a motion vector obtains votes equal to or greater than a set value, that motion vector is the movement direction of the target object candidate.

Note that in the present embodiment, a movement direction calculation method, such as the abovementioned method, is described, but another object detection method may be used as long as calculation of the motion vector is possible.

Next, the spatiotemporal fragment extraction unit is described in further detail.

Hereafter, the case in which a straight line is generated as a fragment extraction line 32 is described. First, the fragment extraction line generation unit 1641 defines a straight line and a curved line in the image. Here, the case where the fragment extraction line 32 is found by drawing a straight line in the image is described.

The fragment extraction line can be defined as:

$$Y_i = aX_i + b$$

Here, slope a is a parameter regarding the movement direction of the moving object in the image, and b is an intercept in the image.

Here, the slope a can be found from the movement direction of the target object candidate as calculated by the movement direction calculation unit 1630. The spatiotemporal fragment extraction unit 1640 generates the fragment extraction line 32 by changing the value of the intercept b in accordance with the slope a, and can extract a spatiotemporal fragment 33. The generated spatiotemporal fragment 33 is sent to the inter-leg information extraction unit 1650 where inter-leg information is extracted, and is further sent to the periodicity analysis unit 1660 where periodicity analysis is carried out. FIG. 20 shows one example of an effect of the movement direction calculation unit 1630. In this manner, it is possible to greatly reduce the number of fragment extraction lines 32 by calculating the movement direction, and the computation amount can be decreased.

The spatiotemporal data cutting unit 1642 carries out extraction of the spatiotemporal fragment 33. Extraction of the spatiotemporal fragment 33 is carried out by cutting spatiotemporal data 31, generated by the spatiotemporal data generation unit 1620, using the fragment extraction line 32.

The spatiotemporal fragment 33 is sent to the inter-leg information extraction unit 1650 where the inter-leg information is extracted, and is further sent to the periodicity analysis unit 1660 where periodicity analysis is carried out. The periodicity analysis unit 1660 carries out periodicity analysis on the spatiotemporal fragment 33, and when that periodicity analysis finishes, outputs, to the fragment extraction line generation unit 1641, a fragment extraction line 32 parameter change signal, which is a signal indicating a parameter change for the fragment extraction line 32. Hereafter, in the same manner, the spatiotemporal fragment extraction unit 1640 creates the fragment extraction line 32 and creates the spatiotemporal fragment 33 until inputting of the fragment extraction line parameter change signal has finished.

Next, the inter-leg information extraction unit 1650 is described in further detail.

The inter-leg information extraction unit 1650 creates one-dimensional data 52 per time t as shown in the example in FIG. 5B for a spatiotemporal fragment 51 as shown in FIG. 5A, and calculates an autocorrelation function for each one-dimensional data 52.

Note that time in FIG. 5A is a frame number N pre-determined by the spatiotemporal data generation unit 1620. Length in FIG. 5B is a width X of the spatiotemporal fragment 51 shown in FIG. 5A. Calculation of the autocorrelation function 53 can be defined by the aforementioned equation 2.

Here, f(x) is the one-dimensional data 52, and C($\tau$) is the autocorrelation function 53. In other words, the autocorrelation function C($\tau$) is a measurement of how much one-dimensional data f(x) sheared an interval $\tau$ (f(x+$\tau$)) resembles the original one-dimensional data f(x). A relationship between the autocorrelation function C($\tau$) and $\tau$ is shown in FIG. 5C. An autocorrelation function C(0) takes on a maximum value in order to show a correlation with itself. In addition, an autocorrelation function C($\tau_p$) is a position $\tau_p$ where the autocorrelation function C($\tau$) is a peak, and the interval of an ON pixel with a high correlation in the one-dimensional data is equivalent to $\tau_p$. In the case where one focuses on the legs of the moving object, the position $\tau_p$, which is a peak in the autocorrelation function C($\tau$), indicates the length of step. In other words, it can be expected that a temporal change in the autocorrelation function C($\tau$) indicates a temporal change in the length of step in the movement, and is the periodicity.

In the present embodiment, considering that there are cases in which a peak such as the autocorrelation function C($\tau_p$) does not necessarily exist, analysis of the periodicity is carried out using a position $\tau_L$ where the autocorrelation function C($\tau$)=0. This arises when the legs are in a closed state. Also, hereafter, this $\tau_L$ is called a correlation length. Note that in the present embodiment, the position $\tau_L$ when the autocorrelation function C($\tau$)=0 is the correlation length, but the correlation length does not necessarily have to be the position $\tau_L$ when the autocorrelation function C($\tau$)=0. Anything is acceptable as long as the periodic fluctuation of the length of step can be ascertained.

The correlation length $\tau_L$ is calculated per time, and by arranging, in time order, the correlation lengths $\tau_L$ calculated per time, time-series data 61 of the correlation length is obtained. The time series data 61 of the correlation length $\tau_L$ is shown in FIG. 6A. The time series data 61 of the correlation length $\tau_L$ is, in the case where an ideal spatiotemporal fragment is inputted, equivalent to a temporal fluctuation in the length of step, and fluctuates periodically according to the time. Note that the correlation length $\tau_L$ does not necessarily have to be calculated temporally in a continuous manner; it is acceptable to calculate the correlation length $\tau_L$ of at least one time amount per one step.

Next, the periodicity analysis unit 1660 is described in detail.

The time series data 61 of the correlation length $\tau_L$ calculated by the inter-leg information extraction unit 1650 is inputted into the periodicity analysis unit 1660. The periodicity analysis unit 1660 calculates an autocorrelation function 62 on the time series data 61 of the correlation length $\tau_L$ shown in FIG. 6A. The formula is the same as the aforementioned equation 2. The results of these calculations are shown in FIG. 6B. Here, Ct(f$i$), which is the result of calculating the autocorrelation function on the time series data 61 of the correlation length $\tau_L$, is outputted to the moving object detection unit 1670. In addition, at the same time, the periodicity analysis unit 1660 outputs the fragment extraction line parameter change signal, which is a signal indicating a parameter change, to the fragment extraction line generation unit 1641 of the spatiotemporal fragment extraction unit 1640, in order to extract the spatiotemporal fragment.

Thereafter, in the same manner, the fragment extraction line generation unit 1641 of the spatiotemporal fragment extraction unit 1640 creates the spatiotemporal fragment in accordance with the parameters from the spatiotemporal data, until inputting of the fragment extraction line parameter change signal ends. Here, the fragment extraction line parameter change signal may, based on the movement direction of the moving object candidate calculated by the movement direction calculation unit, change all the fragment extraction line parameters in order to completely cover the surveillance area, and it is also acceptable to change the fragment extraction line parameters until moving object detection is carried out by the moving object detection unit 1670. In addition, the fragment extraction line parameter change signal is b, which is a parameter of the fragment extraction line.

Next, the moving object detection unit 1670 is described in further detail.

The moving object detection unit 1670 includes: a peak extraction unit 1671, which detects a peak position $\alpha_w$ from the autocorrelation function $Ct(\alpha)$ of the correlation length inputted from the periodicity analysis unit 1660, and judges whether or not an object is a moving object by verifying whether or not the detected peak position $\alpha_w$ matches with the movement period of a moving object; and a presence position isolation unit 1672, which, in the case of judging to be a moving object, isolates and outputs, to the video display unit 1680, the presence position and movement direction of the moving object.

The autocorrelation function $Ct(\alpha)$ of the correlation length is a measurement of how much $\tau_L(t+\alpha)$, in which $\tau_L(t)$ is sheared an interval $\alpha$, resembles $\tau_L(t)$. In the present embodiment, detection of the peak position $\alpha_w$ is carried out by searching from a position $\alpha=0$ and detecting the first peak. However, it is acceptable to use another peak detection method, and acceptable to use a method which searches for a peak in the vicinity of a frame number determined by the designer, described later.

In the present embodiment, the case in which the movement period of one step amount of movement is detected, is described. The peak detection unit 1671 of the moving object detection unit 1670 judges that an object is a moving object in the case where the peak position $\alpha_w$ is the frame number necessary for one step of movement. The frame number necessary for one step of movement differs depending on how many frames can be acquired in one second by the camera image acquisition unit 1610. However, in the present embodiment, in the case where 30 frames are inputted in one second, 20 to 30 frames is the frame number necessary for one step of movement, and an object is judged to be a moving object when a peak of the autocorrelation function $Ct(\alpha)$ of the correlation length, when the peak position a is between 20 and 30 frames, is detected. This frame number can be freely determined by the designer.

Note that it is possible to detect periodicity using two or more steps as one unit, in the case where moving object judgment is carried out at a higher level of precision. In such a case, the frame number determined by the designer can be made applicable by multiplying the amount of steps. In addition, in the case of detecting an animal such as a dog or a cat, it is possible to judge the periodicity in the same manner. In addition, it is also possible to use a Fourier transform instead of calculating the autocorrelation function $Ct(\alpha)$. In this case, it is judged whether or not a peak exists in a specific frequency.

In addition, in the present embodiment, the case where images are inputted on a per-frame basis is described, but it is also acceptable to use images sampled within a set time. In such a case, it is acceptable to calculate the peak position a W of the peak detection unit 1671 from the time necessary for the moving object to move one step.

In the case where a peak unique to the movement of a moving object is detected from the autocorrelation function of the correlation length, the peak detection unit 1671 isolates, through the presence position isolation unit 1672, and outputs, to the video display unit 1680, the presence position and movement direction of the moving object.

The presence position isolation unit first isolates the movement direction and presence position from the fragment extraction line parameters a and b of the time when a peak is detected by the peak detection unit 1671. Note that, as mentioned earlier, in the case where it is highly possible that a plurality of moving objects exist within the surveillance area, by dividing the spatiotemporal fragment into subregions and carrying out processing, the influence of overlapping of moving objects and so on is diminished, and it is possible to realize accurate moving object detection. Once again, this does not limit the method for isolating the presence position 72.

The video display unit 1680 arranges and displays the presence position and movement direction of the moving object as detected by the moving object detection unit 1670 in a downward-view diagram. Through this, it is possible to simultaneously detect the time, position, and movement direction in which a moving object that has periodic movement exists.

As described above, in the present embodiment, the movement direction of the moving object is calculated, inter-leg information aligned with that movement direction is extracted, and the moving object is detected; therefore, the scope of the search required for extraction of the inter-leg information is narrowed down, and the moving object is detected in a shorter amount of time. In addition, it is possible to detect the movement direction at the same time as the presence position of the moving object.

Note that the present process does not limit the method for searching the fragment extraction line parameters.

Also, in the present embodiment, a moving object such as a human is the target of detection, but it is possible to obtain the same effects as long as the moving object is something that moves via two or more legs.

In addition, the movement direction calculation unit 1630 of the present process is also usable in the second embodiment, and as the movement calculation unit 1630 can reduce the number of combinations of the time series combination generation unit 830, reduction of the computational load and a more accurate periodicity judgment can be carried out.

Fifth Embodiment

Next, a moving object detection device according to the fifth embodiment of the present invention is described.

Figure 21:
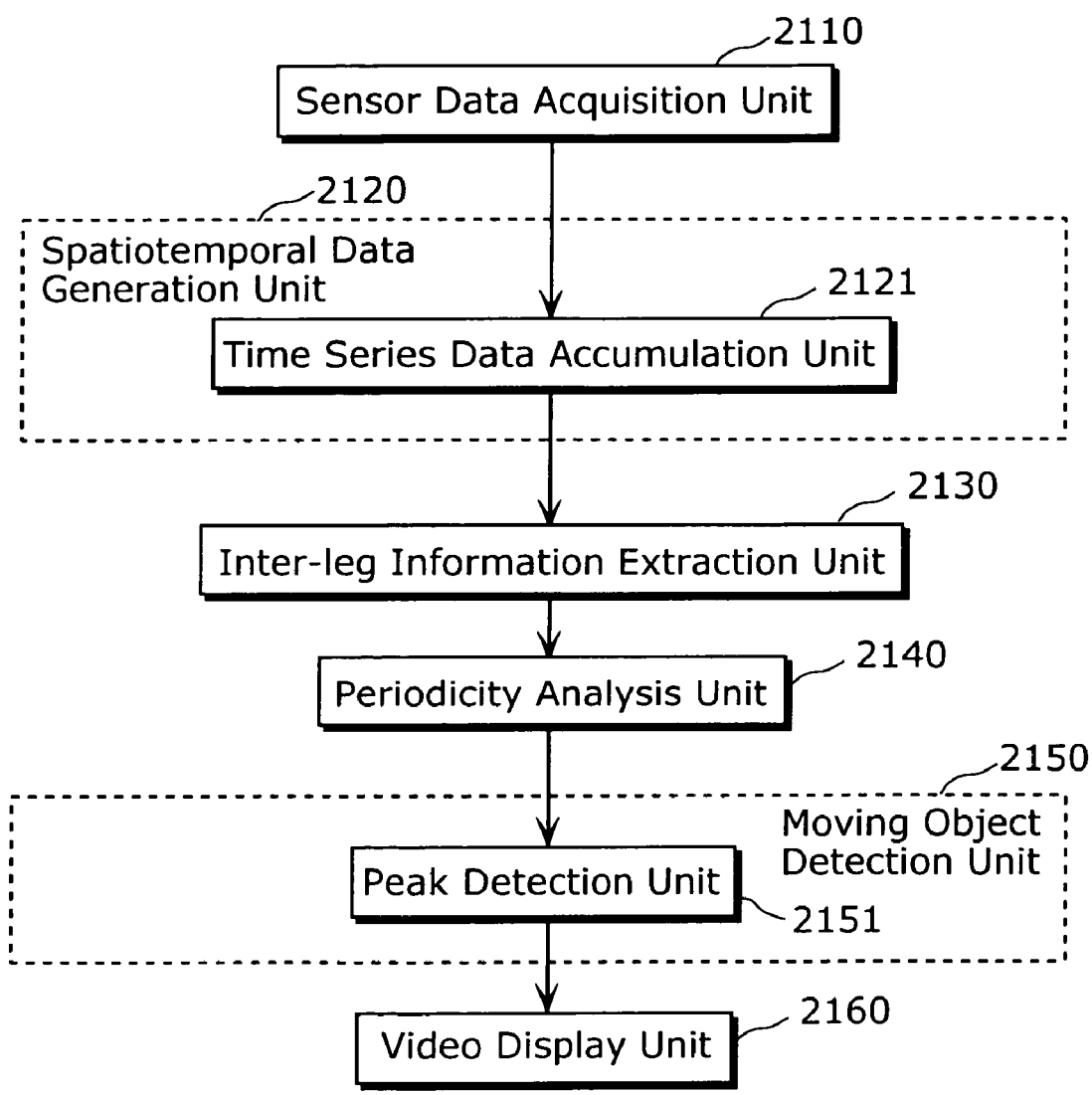
FIG. 21 is a diagram showing a configuration of a moving object detection device according to the fifth embodiment of the present invention.

FIG. 21 is a diagram showing a configuration of the moving object detection device according to the present embodiment. This moving object detection device is, as in the first embodiment and so on, a device that detects a moving object which exists in a video filmed in a shop, a parking lot, a city street, and so on, but has a characteristic of detecting a moving object using sensor information from a line sensor and the like, and includes: a sensor data acquisition unit 2110; a spatiotemporal data generation unit 2120; an inter-leg information extraction unit 2130; a periodicity analysis unit 2140; a moving object detection unit 2150; and a video display unit 2160.

The sensor data acquisition unit 2110 sends, to the spatiotemporal data generation unit 2120, data obtained per time from a line sensor, a photo detector, a pressure sensor, and so on. Here, sensor data may be any data arranged in time order; for example, data sampled over a set time interval.

The spatiotemporal data generation unit 2120 is a processing unit and storage device which, as a unit that emphasizes a predetermined periodicity within time series sensor data, carries out noise removal and binarizes the sensor data based on a threshold value, and by accumulating the post-transformation sensor data in time order, generates spatiotemporal data using sensor data of a pre-determined time N.

The inter-leg information extraction unit 2130 is a processing unit that calculates an inter-leg space per time for the spatiotemporal data generated by the spatiotemporal data generation unit 2120.

The periodicity analysis unit 2140 is a processing unit that carries out periodicity analysis in order to detect a periodicity appearing particularly in movement of the moving object, and detects a periodicity unique to a moving object.

The moving object detection unit 2150 is a processing unit which is inputted with periodicity data calculated by the periodicity analysis unit 2140, and from that periodicity data, judges whether or not an object is a moving object.

The video display unit 2160 is an LCD and the like which shows the detection results, and displays the presence position and movement direction of the moving object in a downward-view diagram, notifies the presence of a moving object, and so on.

Here, the spatiotemporal data generation unit 2120 includes a time series data accumulation unit 2121. This time series data accumulation unit 2121 is a memory and the like which, in order to generate spatiotemporal data from the detected data, accumulates the data in time order as a buffer.

In addition, the inter-leg information extraction unit 2130 calculates an autocorrelation function per time t on a spatiotemporal fragment. The periodicity analysis unit 2140 re-calculates an autocorrelation function on a time series of a correlation length, in which each calculated correlation length is arranged in time direction.

Furthermore, the moving object detection unit 2150 includes a peak detection unit 2151, which detects a peak position from the autocorrelation function of the correlation length inputted from the periodicity analysis unit 2140, judges whether an object is a moving object or not by verifying whether or not the detected peak position matches a movement period of the moving object, and outputs the judgment result to the video display unit 2160 when a peak is detected.

Figure 22:
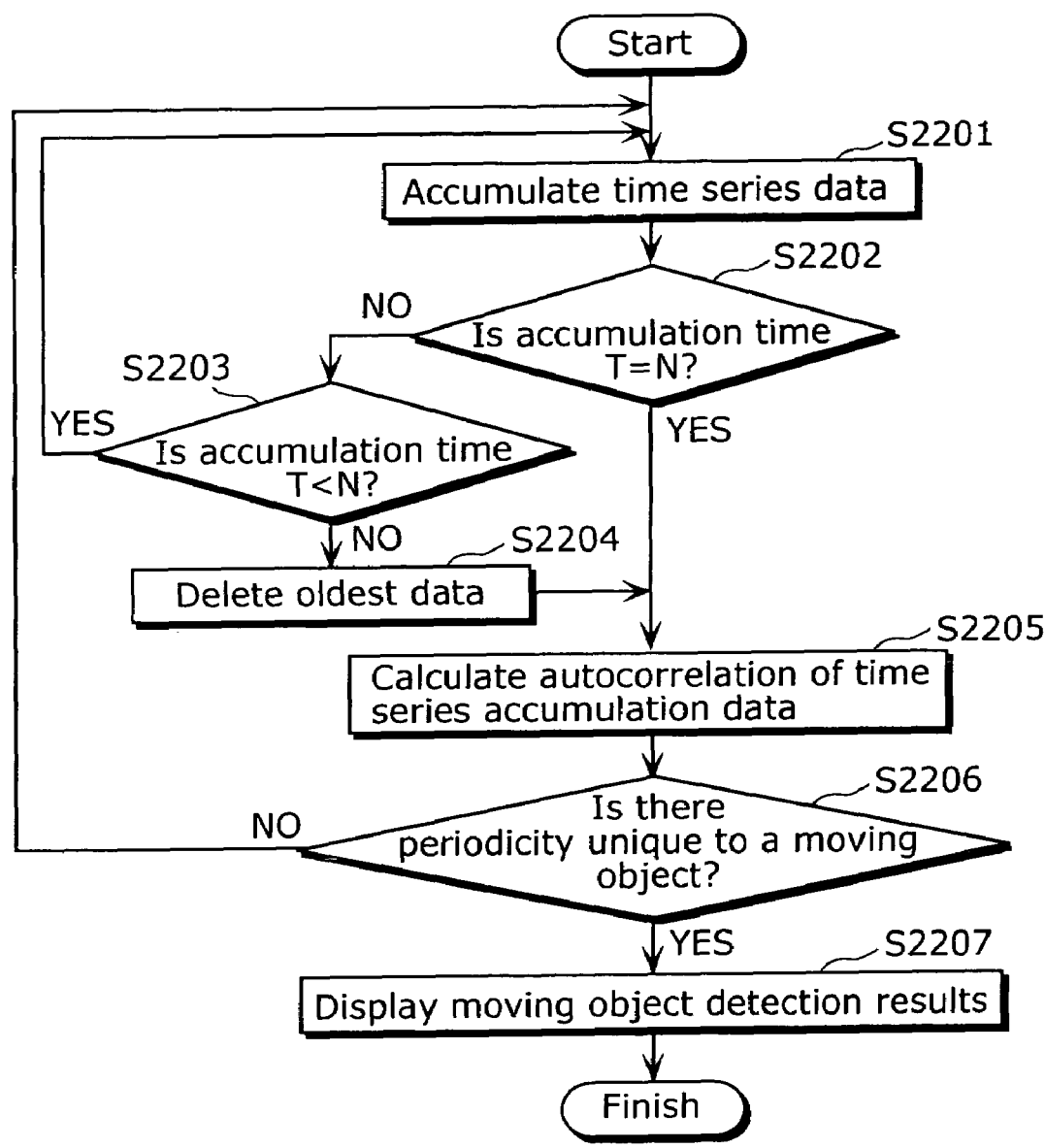
FIG. 22 is a flowchart showing an operation of the moving object detection device.

Next, the flowchart in FIG. 22 is used to describe, in detail, an operation of the moving object detection device according to the present embodiment and configured in the abovementioned manner.

First, in S2201, the time series data accumulation unit 2121 accumulates the data obtained from the sensor as a buffer in time order, in order to generate the spatiotemporal data from the data obtained from the sensor. Note that it is also possible for the configuration of the spatiotemporal data generation unit 2120 to take on a different configuration depending on the embodiment.

In S2202, the time series data generation unit 2121 generates the spatiotemporal data using the sensor data, and the process moves to S2205 in the case where time N amount (N being a natural number) of sensor data is accumulated, whereas the process moves to S2203 in the case where time N amount of sensor data is not accumulated.

In S2203, the process moves to S2201 in the case where the accumulated sensor data is less than time N, whereas the process moves to S2204 in the case where the accumulated sensor data exceeds time N.

In S2204, in the case where an N+1 th sensor data is sent from the sensor data acquisition unit 2110, the time series data accumulation unit 2121 generates spatiotemporal data which always holds N amount of data, by canceling a first sensor data from the spatiotemporal data. Here, it is not necessary to input and cancel one time at a time; any means is acceptable as long as data of time N amount, arranged in time order, can be acquired. In addition, the data does not have to be per time 1, but may be data sampled in a set time.

In S2205, the inter-leg information extraction unit 2130 carries out calculation of the autocorrelation function per time in order to extract the inter-leg information, on the spatiotemporal fragment extracted in S2204.

In S2206, the periodicity analysis unit 2140 analyzes a periodicity from a temporal change in the inter-leg information detected in S2205, and the moving object detection unit 2150 judges the presence of lack thereof of periodicity unique to a moving object based on the periodicity analysis results from the spatiotemporal fragment as calculated by the periodicity analysis unit 2140; the process moves to S2205 in the case where there is periodicity unique to a moving object, and the process moves to S2201 in the case where there is not periodicity unique to a moving object.

Finally, in S2207, the video display unit 2160 displays information of the moving object detected by the moving object detection unit 2150. Here, it is also possible to use an instrument which sounds an alarm and so on in the case where the moving object is a predetermined moving object. In addition, when in combination with a camera, a target can be filmed.

Next, the sensor data acquisition unit 2110 is described in further detail.

In the present embodiment, the case described is the case where laser generators are arranged in the first dimension and sensing is carried out through a photo detector. However, it is also possible to use a sensor and transmitter that obtains one-dimensional data, such as a line camera, a line sensor, and so on. In addition, in the case of using a pressure sensor and the like installed in the second dimension, it is possible to handle the sensor and images simultaneously, and therefore the sensor may be included in the previous embodiments.

Figure 23A:
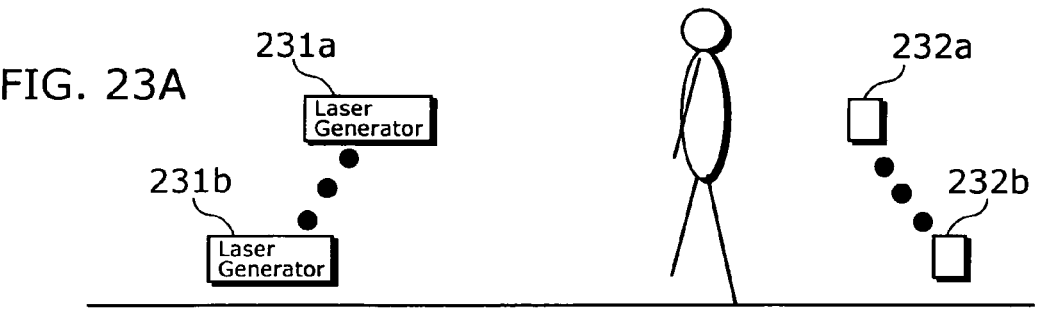
FIGS. 23A to 23C are diagrams showing an example of sensor arrangement.
Figure 23B:
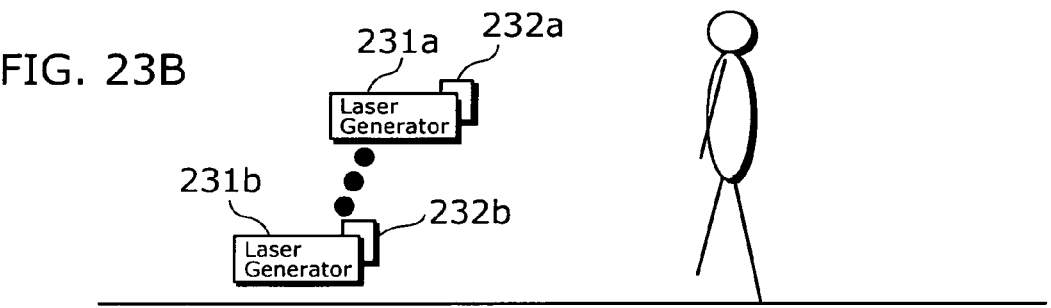
Figure 23C:
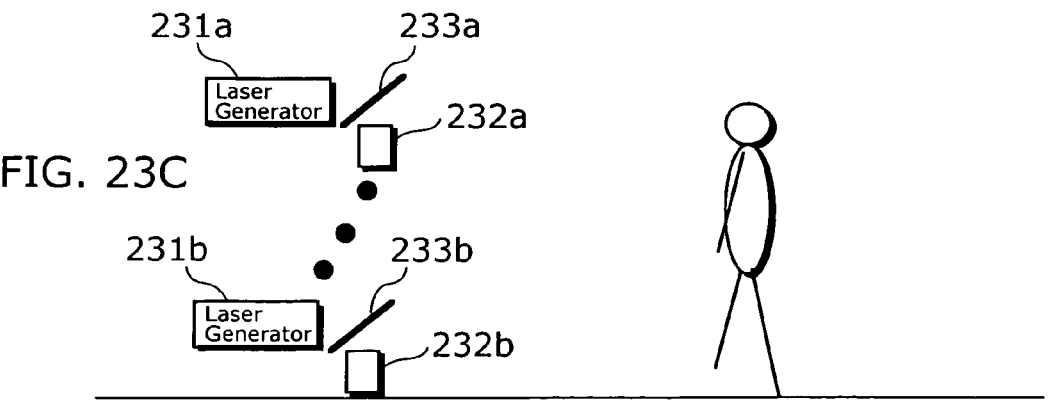

FIGS. 23A to 23C show an installation example of laser generators 231a to 231b and photo detectors 232a to 232b. In the present embodiment, the laser generators 231a to 231b and the photo detectors 232a to 232b are arranged one-dimensionally in a region targeted for detection. The laser generators 231a to 231b and the photo detectors 232a to 232b may be installed so as to face one another, as in FIG. 23A, and may also be installed on the same side of the target object for detection, as in FIGS. 23B and 23C. Furthermore, it is acceptable to cause the lasers to be reflected by half-mirrors 233a to 233b, as shown in FIG. 23C. In addition, when the purpose is detection of a human, it is preferable to install the sensors and transmitters approximately 10 cm above the ground.

When data acquired from the sensors set in the above manner is binarized based on a threshold value, and time N amount is accumulated by the time series data accumulation unit, it is possible to obtain ideal spatiotemporal data, as shown in FIG. 5. Through this, spatiotemporal fragment extraction becomes unnecessary, and computation time can be greatly reduced.

The inter-leg information extraction unit 2130 calculates the inter-leg distance in each time, and the periodicity analysis unit 2140 carries out analysis of the periodicity of the spatiotemporal data. This inter-leg information extraction unit 2130 creates one-dimensional data per time t, as shown in the example in FIG. 5B, from the spatiotemporal data, which is an accumulation of data obtained from the sensors, and calculates an autocorrelation function 53 for each one-dimensional data 52. Therefore, it is not necessary to include a spatiotemporal data generation unit 2120; anything is acceptable as long as it processes data of a set time amount as a whole.

Note that time in FIG. 5A is a time N pre-determined by the spatiotemporal data generation unit 2120. Length in FIG. 5B is a width X of the spatiotemporal fragment 51 shown in FIG. 5A. Calculation of the autocorrelation function 53 can be defined by the aforementioned equation 2.

Here, f(x) is the one-dimensional data 52, and $C(\tau)$ is the autocorrelation function 53. In other words, the autocorrelation function $C(\tau)$ is a measurement of how much one-dimensional data f(x) sheared an interval $\tau$ (f(x+$\tau$)) resembles the original one-dimensional data f(x). A relationship between the autocorrelation function $C(\tau)$ and $\tau$ is shown in FIG. 5C. An autocorrelation function $C(0)$ takes on a maximum value in order to show a correlation with itself. In addition, an autocorrelation function $C(\tau_p)$ is a position $\tau_p$ where the autocorrelation function $C(\tau)$ is a peak, and the interval of an ON pixel with a high correlation in the one-dimensional data is equivalent to $\tau_p$. In the case where one focuses on the legs of the moving object, the position $\tau_p$, which is a peak in the autocorrelation function $C(\tau)$, indicates the length of step. In other words, it can be expected that a temporal change in the autocorrelation function $C(\tau)$ indicates a temporal change in the length of step in the movement, and is the periodicity.

In the present embodiment, considering that there are cases in which a peak such as the autocorrelation function $C(\tau_p)$ does not necessarily exist, analysis of the periodicity is carried out using a position $\tau_L$ where the autocorrelation function $C(\tau)=0$. This arises when the legs are in a closed state. Also, hereafter, this $\tau_L$ is called a correlation length. Note that in the present embodiment, the position $\tau_L$ when the autocorrelation function $C(\tau)=0$ is the correlation length, but the correlation length does not necessarily have to be the position $\tau_L$ when the autocorrelation function $C(\tau)=0$. Anything is acceptable as long as the periodic fluctuation of the length of step can be ascertained.

The correlation length $\tau_L$ is calculated per time, and by arranging, in time order, the correlation lengths $\tau_L$ calculated per time, time-series data 61 of the correlation length is obtained. The time series data 61 of the correlation length $\tau_L$ is shown in FIG. 6A. The time series data 61 of the correlation length $\tau_L$ is, in the case where an ideal spatiotemporal fragment is inputted, equivalent to a temporal fluctuation in the length of step, and fluctuates periodically according to the time.

Next, the periodicity analysis unit 2140 is described in further detail.

The time series data 61 of the correlation length $\tau_L$ calculated by the inter-leg information extraction unit 2130 is inputted into the periodicity analysis unit 2140. The periodicity analysis unit 2140 calculates an autocorrelation function 62 on the time series data 61 of the correlation length $\tau_L$ shown in FIG. 6A. The formula is the same as the aforementioned equation 2. The results of these calculations are shown in FIG. 6B. Here, $Ct(\alpha)$, which is the result of calculating the autocorrelation function on the time series data 61 of the correlation length $\tau_L$, is outputted to the moving object detection unit 2150.

Next, the moving object detection unit 2150 is described in further detail.

The moving object detection unit 2150 includes a peak extraction unit 2151, which detects a peak position $\alpha_w$ from the autocorrelation function $Ct(\alpha)$ of the correlation length inputted from the periodicity analysis unit 2140, and judges whether or not an object is a moving object by verifying whether or not the detected peak position $\alpha_w$ matches with the movement period of a moving object.

Note that the autocorrelation function $Ct(\alpha)$ of the correlation length is a measurement of how much $\tau_L(t+\alpha)$, in which $\tau_L(t)$ is sheared an interval $\alpha$, resembles $\tau_L(t)$. In the present embodiment, detection of the peak position $\alpha_w$ is carried out by searching from a position $\alpha=0$ and detecting the first peak. However, it is acceptable to use another peak detection method, and acceptable to use a method which searches for peaks in a period vicinity determined by the designer, described later.

In the present invention, the case described is the case where a movement cycle in 1 step amount of movement is detected. The peak detection unit 2151 of the moving object detection unit 2150 judges that an object is a moving object in the case where the peak position $\alpha_w$ is the time amount necessary for one step of movement. The time necessary for one step of movement differs depending on the amount of data acquired by the sensor data acquisition unit 2110 in 1 second. However, in the case where 30 time amounts are inputted in 1 second, 20 to 30 is the time necessary for one step of movement, and an object is judged to be a moving object when a peak of the autocorrelation function $Ct(\alpha)$ of the correlation length, when the peak position $\alpha$ is between 20 and 30, is detected. This peak position can be freely determined by the designer.

Note that it is possible to detect periodicity using two or more steps as one unit, in the case where moving object judgment is carried out at a higher level of precision. In such a case, the time determined by the designer can be made applicable by multiplying the amount of steps. In addition, in the case of detecting an animal such as a dog or a cat, it is possible to judge the periodicity in the same manner. In addition, it is also possible to use a Fourier transform instead of calculating the autocorrelation function $Ct(\alpha)$. In this case, it is judged whether or not a peak exists in a specific frequency.

In addition, in the present embodiment, the case where a time amount 30 of data is inputted in 1 second, but it is also acceptable to use data sampled over a set time. In such a case, it is acceptable to calculate the peak position $\alpha_w$ of the peak detection unit 2151 from the time necessary for the moving object to move one step.

In the case where a peak unique to the movement of a moving object is detected from the autocorrelation function of the correlation length, the peak detection unit 2152 outputs, to the video display unit 2160, the detection of the target object. Through this, it is possible to differentiate between a moving object which has cyclic movement and other moving objects and detect the moving object, and possible to process at high speeds as well as reducing mistaken detections.

As described above, according to the present embodiment, using the time series data, the moving object is detected based on the periodicity analysis which is in turn based upon the legs of the moving object being in a closed state or being in a widely-opened state. Therefore, it is possible to carry out stable detection of a moving object without mistakenly recognizing another moving object.

In other words, the moving object detection device according to the present invention is typically realized as a moving object detection device that detects a moving object based on an output from a target object detection sensor installed one- or two-dimensionally, and includes: a spatiotemporal data generation unit that generates, based on the output from the target object detection sensor, time series data which indicates a spatiotemporal image in which two-dimensional images that show a moving object are arranged along a time axis; a spatiotemporal fragment extraction unit that extracts a spatiotemporal fragment, which is an image found in a cut plane or cut fragment when the spatiotemporal image is cut along the time axis; an inter-leg information extraction unit that extracts, based on the extracted spatiotemporal fragment, inter-leg information which is information regarding an inter-leg temporal change arising from movement of a moving object that has two or more legs; a periodicity analysis unit that analyzes a periodicity found in the extracted inter-leg information; a movement information generation unit generates, from the analyzed periodicity, movement information that includes whether or not the moving object is present; and a parameter change unit that changes, based on the generated movement information, spatiotemporal fragment extraction parameters, which are parameters that specify the cut plane or cut fragment; the spatiotemporal fragment extraction unit extracts, as the spatiotemporal fragment, an image found when the spatiotemporal image is cut by the cut plane or cut fragment indicated by the spatiotemporal fragment extraction parameters changed by the parameter change unit.

Here, the inter-leg information extraction unit may extract, as the inter-leg information, a temporal interval or a spatial interval of an opened state or a closed state of the legs of the moving object. Through this, the presence or absence of a moving object is judged by the step length and the like unique to an animal with legs, so a human and the like is detected within an image with certainty.

In addition, the inter-leg information extraction unit may further generate a time series of parameters specifying a geometric figure, by applying the geometric figure that indicates a temporal change in the inter-leg area to the time series data, and to extract the inter-leg information based on the generated time series of parameters. For example, the geometric figure is two or more straight lines which have modeled legs of an animal including a human, and the parameters are an angle at which the straight lines intersect; the inter-leg information extraction unit extracts, as the inter-leg information, information that indicates a temporal change in an angular rate of the angle. Through this, the geometric figure modeling the legs of an animal including a person is applied, and therefore a moving object with two or more legs is more positively detected, as compared to a conventional method in which a general geometric figure, a geometric figure for the entire moving object, and the like are applied.

In addition, the target object detection sensor may generate images, and the spatiotemporal data generation unit may generate, as the time series data, time series image data in which the images generated by the target object detection sensor are arranged along the time axis; and the spatiotemporal data generation unit may generate the time series image data by carrying out background differential processing or inter-frame differential processing on the images. Through this, reference fluctuation, noise, and the like are eliminated, and periodic movement such as gait is extracted from the image data; therefore, moving object detection that is robust against noise, environment fluctuation, and the like, is possible.

Also, in the present embodiment, a moving object such as a human is the target for detection, but the same effect can be obtained as long as the moving object moves via two or more legs.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention may be used as a device and the like that detects a moving object that has two or more legs, such as a human; for example, as a surveillance device and the like set in a building or on a street, and as a moving object detection device and the like that can carry out moving object detection without limiting a detection position in an image, especially in the case where a presence position and movement direction of the moving object are not known in advance.

What is claimed is:

1. A moving object detection device that detects a moving object based on an output from a target object detection sensor installed one- or two-dimensionally, said device comprising:

a spatiotemporal data generation unit operable to generate, based on the output from the target object detection sensor, time series data which indicates a spatiotemporal image in which two-dimensional images that show the moving object are arranged along a time axis;

a spatiotemporal fragment extraction unit operable to extract a spatiotemporal fragment from the spatiotemporal image indicated by the generated time series data, the spatiotemporal fragment being an image found in a cut plane or a cut fragment when the spatiotemporal image is cut along the time axis;

an inter-leg information extraction unit operable to extract, based on the extracted spatiotemporal fragment, inter-leg information, which is information regarding an inter-leg temporal change arising from a movement of the moving object that has two or more legs;

a periodicity analysis unit operable to analyze a periodicity found in the extracted inter-leg information;

a movement information generation unit operable to generate, from the analyzed periodicity, movement information that indicates whether or not the moving object is present; and a parameter change unit operable to change, based on the generated movement information, spatiotemporal fragment extraction parameters, the spatiotemporal fragment extraction parameters specifying the cut plane or the cut fragment, wherein said spatiotemporal fragment extraction unit is operable to extract, as the spatiotemporal fragment, an image found when the spatiotemporal image is cut by the cut plane or the cut fragment specified by the spatiotemporal fragment extraction parameters changed by said parameter change unit.

2. The moving object detection device according to claim 1, wherein said inter-leg information extraction unit is operable to extract, as the inter-leg information, a temporal interval or a spatial interval indicated by a step length of the moving object.

3. The moving object detection device according to claim 1, wherein said inter-leg information extraction unit is operable to extract, as the inter-leg information, data that indicates a temporal change in a correlation length, which is a spatial interval in which an autocorrelation value is a minimum value or a peak value, the correlation length being calculated per one-dimensional data, and the one-dimensional data being data per unit time that forms the spatiotemporal fragment.

4. The moving object detection device according to claim 1, wherein said parameter change unit is operable to change the spatiotemporal fragment extraction parameters until movement information, which indicates that the moving object exists, is generated by said movement information generation unit.

5. The moving object detection device according to claim 4, further comprising a movement direction calculation unit operable to calculate, from time series data generated by said spatiotemporal data generation unit, a movement direction of the moving object indicated by the time series data, wherein said spatiotemporal fragment extraction unit is operable to cut the spatiotemporal image in accordance with the movement direction.

6. The moving object detection device according to claim 1, wherein said spatiotemporal data generation unit is further operable to divide each respective image that forms the spatiotemporal image into subregions, transform each respective image that form the spatiotemporal image into parameters, as an image characteristic volume, per each subregion of the respective image, to obtain parameters for N images, and generate an N-dimensional parameter vector which results from collecting the obtained parameters for N images, and wherein said inter-leg information extraction unit is further operable to extract the inter-leg information based on the N-dimensional parameter vector.

7. The moving object detection device according to claim 6, further comprising a time series combination generation unit operable to generate, from the N-dimensional parameter vector, a time series combination of parameter vectors, by combining parameters that have a predetermined relationship in time series, wherein said inter-leg information extraction unit is operable to extract the inter-leg information based on the time series combination.

8. The moving object detection device according to claim 7, wherein said inter-leg information extraction unit is operable to calculate, for the time series combination, a correlation length, which is a spatial interval in which an autocorrelation value is a minimum value or a peak value, and to extract, as the inter-leg information, data that indicates a temporal change in the calculated correlation length.

9. The moving object detection unit according to claim 6, wherein the N-dimensional parameter vector includes, as the image characteristic volume, one of a wavelet transform coefficient, a Hough transform parameter, and a frequency based on a Fourier transform.

10. The moving object detection device according to claim 6, wherein the target object detection sensor is a camera that generates a two-dimensional image, and wherein said spatiotemporal data generation unit is operable to generate the subregions by dividing the two-dimensional image into sizes determined in accordance with setting parameters of the camera, and generate the N-dimensional parameter vector for the generated subregions.

11. The moving object detection device according to claim 1, wherein said inter-leg information extraction unit is farther operable to generate a time series of parameters specifying a geometric figure, by applying the geometric figure that indicates a temporal change in an inter-leg area to the time series data, and to extract the inter-leg information based on the generated time series of parameters.

12. The moving object detection device according to claim 11, wherein the geometric figure is two or more straight lines which have modeled legs of an animal including a human, and the parameters specifying the geometric figure are an angle at which the straight lines intersect.

13. The moving object detection device according to claim 12, wherein said inter-leg information extraction unit is operable to extract, as the inter-leg information, information that indicates a temporal change in the angle.

14. The moving object detection device according to claim 1, wherein said periodicity analysis unit is operable to transform the inter-leg information into a frequency and analyze the periodicity from a spectrum of the frequency obtained by transforming the inter-leg information.

15. The moving object detection device according to claim 1, wherein the target object detection sensor generates images, and wherein said spatiotemporal data generation unit is operable to generate, as the time series data, time series image data in which the images generated by the target object detection sensor are arranged along the time axis.

16. The moving object detection device according to claim 15, wherein said spatiotemporal data generation unit is operable to generate the time series image data by performing a Hough transform, a Fourier transform, or a wavelet transform on the images generated by the target object detection sensor.

17. The moving object detection device according to claim 1, wherein said movement information generation unit is operable to specify an autocorrelation peak position in the inter-leg information, judge whether or not the moving object exists by judging whether or not the isolated peak position matches a movement period unique to the moving object, and generate movement information indicating a result of the judgment.

18. The moving object detection device according to claim 17, wherein said movement information generation unit is, when said movement information generation unit judges that the moving object exists, further operable to isolate, and generate as the movement information, a presence position and a movement direction of the moving object.

19. A moving object detection method for detecting a moving object based on an output from a target object detection sensor installed one- or two-dimensionally, said method comprising:

generating, based on the output from the target object detection sensor, time series data which indicates a spatiotemporal image in which two-dimensional images that show the moving object are arranged along a time axis;

extracting a spatiotemporal fragment from the spatiotemporal image indicated by the generated time series data, the spatiotemporal fragment being an image found in a cut plane or a cut fragment when the spatiotemporal image is cut along the time axis;

extracting, based on the extracted spatiotemporal fragment, inter-leg information, which is information regarding an inter-leg temporal change arising from a movement of the moving object that has two or more legs;

analyzing a periodicity found in the extracted inter-leg information;

generating, from the analyzed periodicity, movement information that indicates whether or not the moving object is present; and changing, based on the generated movement information, spatiotemporal fragment extraction parameters, the spatiotemporal fragment extraction parameters specifying the cut plane or the cut fragment, wherein an image found when the spatiotemporal image is cut by the cut plane or the cut fragment specified by the spatiotemporal fragment extraction parameters changed in said changing of the spatiotemporal fragment extraction parameter is extracted as the spatiotemporal fragment in said extracting of the spatiotemporal fragment.

20. A computer-readable recording medium having a program recorded thereon, the program for detecting a moving object based on an output from a target object detection sensor installed one- or two-dimensionally, said program causing a computer to execute a method comprising:

generating, based on the output from the target object detection sensor, time series data which indicates a spatiotemporal image in which two-dimensional images that show the moving object are arranged along a time axis;

extracting a spatiotemporal fragment from the spatiotemporal image indicated by the generated time series data, the spatiotemporal fragment being an image found in a cut plane or a cut fragment when the spatiotemporal image is cut along the time axis;

extracting, based on the extracted spatiotemporal fragment, inter-leg information, which is information regarding an inter-leg temporal change arising from a movement of the moving object that has two or more legs;

analyzing a periodicity found in the extracted inter-leg information;

generating, from the analyzed periodicity, movement information that indicates whether or not the moving object is present; and changing, based on the generated movement information, spatiotemporal fragment extraction parameters, the spatiotemporal fragment extraction parameters specifying the cut plane or the cut fragment, wherein an image found when the spatiotemporal image is cut by the cut plane or the cut fragment specified by the spatiotemporal fragment extraction parameters changed in said changing of the spatiotemporal fragment extraction parameter is extracted as the spatiotemporal fragment in said extracting of the spatiotemporal fragment.

* * * * *